US010742947B2

(12) United States Patent
Mujibiya et al.

(10) Patent No.: US 10,742,947 B2
(45) Date of Patent: Aug. 11, 2020

(54) DISPLAY CONTROL SYSTEM, DISPLAY CONTROL DEVICE, DISPLAY CONTROL METHOD, AND PROGRAM

(71) Applicant: Rakuten, Inc., Tokyo (JP)

(72) Inventors: Adiyan Mujibiya, Tokyo (JP); Shogo Yamashita, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 15/323,968

(22) PCT Filed: Mar. 30, 2015

(86) PCT No.: PCT/JP2015/059995
§ 371 (c)(1),
(2) Date: Jan. 5, 2017

(87) PCT Pub. No.: WO2016/157385
PCT Pub. Date: Oct. 6, 2016

(65) Prior Publication Data
US 2017/0201733 A1     Jul. 13, 2017

(51) Int. Cl.
*H04N 13/00* (2018.01)
*H04N 13/111* (2018.01)
(Continued)

(52) U.S. Cl.
CPC .......... *H04N 13/111* (2018.05); *G06Q 30/08* (2013.01); *H04N 5/225* (2013.01); *H04N 5/262* (2013.01);
(Continued)

(58) Field of Classification Search
USPC .............................................. 386/43; 348/43
See application file for complete search history.

(56) References Cited

U.S. PATENT DOCUMENTS 6,363,169 B1   3/2002 Ritter et al.
6,762,755 B2   7/2004 Chen
(Continued)

FOREIGN PATENT DOCUMENTS

JP     2012-124745 A     6/2012
JP     2012-142860 A     7/2012

OTHER PUBLICATIONS

English translation of the International Search Report for PCT/JP2015/059995.

*Primary Examiner* — Nigar Chowdhury
(74) *Attorney, Agent, or Firm* — HEA Law PLLC

(57) ABSTRACT

Labor of photographing images of an object can be reduced in a case where the images of the object viewed from a viewpoint moving along with an orbit are displayed. Image obtaining means of a display control system obtains a plurality of image data pieces generated by photographing an object from a plurality of photographing positions that are different from one another in photographing directions. Information obtaining means obtains photograph information relating to the photographing positions of the respective image data pieces in a three-dimensional space based on the image data pieces. Image selecting means selects some of the image data pieces based on the photograph information of the respective image data pieces and orbit information relating to an orbit of a viewpoint that moves while changing a viewing direction in the three-dimensional space. Display control means displays, on display means, the image data pieces selected by the image selecting means in an order according to the orbit.

11 Claims, 14 Drawing Sheets

(51) Int. Cl.
   *H04N 13/221*     (2018.01)
   *H04N 13/349*     (2018.01)
   *H04N 5/262*      (2006.01)
   *H04N 5/225*      (2006.01)
   *H04N 13/178*     (2018.01)
   *G06Q 30/08*      (2012.01)

(52) U.S. Cl.
   CPC ......... *H04N 13/178* (2018.05); *H04N 13/221* (2018.05); *H04N 13/349* (2018.05); *H04N 2013/0081* (2013.01)

(56) References Cited

U.S. PATENT DOCUMENTS

| | | | | |
|---|---|---|---|---|
| 9,921,054 B2* | 3/2018 | Park | ....................... | G01B 11/24 |
| 2002/0085219 A1 | 7/2002 | Ramamoorthy | | |
| 2002/0190991 A1* | 12/2002 | Efran | ................... | H04N 5/2224 |
| | | | | 345/475 |
| 2007/0026975 A1* | 2/2007 | Marty | ................ | A63B 24/0021 |
| | | | | 473/467 |
| 2008/0304706 A1* | 12/2008 | Akisada | ............. | G06K 9/00771 |
| | | | | 382/103 |
| 2008/0312010 A1* | 12/2008 | Marty | ................ | A63B 24/0003 |
| | | | | 473/447 |
| 2011/0286632 A1* | 11/2011 | Tuxen | ................ | A63B 71/0619 |
| | | | | 382/103 |
| 2013/0234926 A1* | 9/2013 | Rauber | ................. | G06F 3/0487 |
| | | | | 345/156 |
| 2013/0329014 A1* | 12/2013 | Obata | ............... | H04M 1/72522 |
| | | | | 348/46 |
| 2014/0172295 A1* | 6/2014 | Denigan | ......... | B60W 30/18145 |
| | | | | 701/468 |
| 2014/0229143 A1* | 8/2014 | Cohen-Or | ............... | G06T 19/20 |
| | | | | 703/1 |
| 2015/0042812 A1* | 2/2015 | Tang | ................... | H04N 5/23206 |
| | | | | 348/157 |
| 2015/0334678 A1* | 11/2015 | MacGougan | ........... | G01S 19/22 |
| | | | | 701/451 |
| 2016/0094790 A1* | 3/2016 | Yu | ......................... | G01S 3/7864 |
| | | | | 348/169 |
| 2016/0255305 A1* | 9/2016 | Ritchey | ............. | G02B 27/0172 |
| | | | | 348/14.03 |
| 2016/0274241 A1* | 9/2016 | Gentry | .................... | G01C 21/00 |
| 2017/0188013 A1* | 6/2017 | Presler | ................. | H04N 5/3765 |
| 2019/0079594 A1* | 3/2019 | Cohen | ................ | G06F 3/04815 |

* cited by examiner

FIG.9

| IMAGE DATA ID | PHOTOGRAPH INFORMATION | | PHOTOGRAPHED FEATURE POINT ID |
|---|---|---|---|
| | PHOTOGRAPHING POSITION | PHOTOGRAPHING DIRECTION | |
| 0 | $P_0$ | $V_0$ | 0,1,2,3,4,5,6,7,8 |
| 1 | $P_1$ | $V_1$ | 0,1,2,3,4,5,6,7,8 |
| 2 | $P_2$ | $V_2$ | 0,1,2,3,4,5,7,8 |
| 3 | $P_3$ | $V_3$ | 0,1,2,3,4,5,6,7,8 |
| 4 | $P_4$ | $V_4$ | 0,1,2,3,4,5,6,7,8 |
| 5 | $P_5$ | $V_5$ | 0,1,2,3,4,5,6,7,8 |
| 6 | $P_6$ | $V_6$ | 0,1,2,3,4,5,6,7,8 |
| 7 | $P_7$ | $V_7$ | 1,2,3,4,5,6,7,8 |
| 8 | $P_8$ | $V_8$ | 0,1,2,3,4,5,6,7,8 |
| 9 | $P_9$ | $V_9$ | 0,1,2,3,4,5,8 |
| 10 | $P_{10}$ | $V_{10}$ | 0,2,3,4,5,7,8 |
| 11 | $P_{11}$ | $V_{11}$ | 0,1,2,4,5,6,7,8 |
| 12 | $P_{12}$ | $V_{12}$ | 0,1,2,3,4,5,6,7,8 |
| 13 | $P_{13}$ | $V_{13}$ | 0,1,2,3,4,5,6,7,8 |
| 14 | $P_{14}$ | $V_{14}$ | 0,1,2,3,4,5,6,7,8 |
| 15 | $P_{15}$ | $V_{15}$ | 0,1,2,3,4,5,6,7,8 |

FIG.10

| FEATURE POINT ID | THREE-DIMENSIONAL COORDINATES |
|---|---|
| 0 | $X_{W0}, Y_{W0}, Z_{W0}$ |
| 1 | $X_{W1}, Y_{W1}, Z_{W1}$ |
| 2 | $X_{W2}, Y_{W2}, Z_{W2}$ |
| 3 | $X_{W3}, Y_{W3}, Z_{W3}$ |
| 4 | $X_{W4}, Y_{W4}, Z_{W4}$ |
| 5 | $X_{W5}, Y_{W5}, Z_{W5}$ |
| 6 | $X_{W6}, Y_{W6}, Z_{W6}$ |
| 7 | $X_{W7}, Y_{W7}, Z_{W7}$ |
| 8 | $X_{W8}, Y_{W8}, Z_{W8}$ |

DISPLAY CONTROL SYSTEM, DISPLAY CONTROL DEVICE, DISPLAY CONTROL METHOD, AND PROGRAM

CROSS REFERENCE TO RELATED APPLICATIONS

This application is a National Stage of International Application No. PCT/JP2015/059995 filed on Mar. 30, 2015. The contents of the above document is incorporated herein by reference in its entirety.

TECHNICAL FIELD

The present invention relates to a display control system, a display control device, a display control method, and a program.

BACKGROUND ART

A technique for accurately presenting condition of an object by shooting the object from various positions has been known. For example, Patent Literature 1 describes serially photographing by a camera an object on a turn table that turns at a predetermined speed, and displaying a video photographed by the camera on a display unit.

CITATION LIST

Patent Document

Patent Literature 1: JP2012-124745A

SUMMARY OF INVENTION

Technical Problem

However, conventionally, images are displayed only along with an orbit on which the object is photographed by the camera, and thus the orbit of the camera actually photographing the object needs to be the same as the orbit of a viewpoint on the display unit. As such, in order that the display unit displays images of the object viewed from the viewpoint moving along various orbits, the object needs to be photographed by moving the camera by the number of orbits, which takes a lot of labor.

One or more embodiments of the present invention have been conceived in view of the above, and an object thereof is to provide a display control system, a display control device, a display control method, and a program capable of reducing labor of photographing an object in a case where images of the object viewed from a viewpoint moving along with an orbit are displayed.

Solution to Problem

In order to solve the above described problems, a display control system according to the present invention includes image obtaining means for obtaining a plurality of image data pieces generated by photographing an object from a plurality of photographing positions that are different from one another in photographing directions, information obtaining means for obtaining photograph information relating to the photographing positions of the respective image data pieces in a three-dimensional space based on the image data pieces, image selecting means for selecting some of the image data pieces based on the photograph information of the respective image data pieces and orbit information relating to an orbit of a viewpoint that moves while changing a viewing direction in the three-dimensional space, and display control means for displaying, on display means, the image data pieces selected by the image selecting means in an order according to the orbit.

The display control device according to the present invention includes information obtaining means for obtaining content stored in storage means that stores a plurality of image data pieces and photograph information in association with one another, the plurality of image data pieces being generated by photographing an object from a plurality of photographing positions that are different from one another in photographing directions, and the photograph information being related to the photographing positions of the respective image data pieces in a three-dimensional space, image selecting means for selecting some of the image data pieces based on the photograph information of the respective image data pieces and orbit information relating to an orbit of a viewpoint that moves while changing a viewing direction in the three-dimensional space, and display control means for displaying, on display means, the image data pieces selected by the image selecting means in an order according to the orbit.

A display control method according to the present invention includes an image obtaining step for obtaining a plurality of image data pieces generated by photographing an object from a plurality of photographing positions that are different from one another in photographing directions, an information obtaining step for obtaining photograph information relating to the photographing positions of the respective image data pieces in a three-dimensional space based on the image data pieces, an image selecting step for selecting some of the image data pieces based on the photograph information of the respective image data pieces and orbit information relating to an orbit of a viewpoint that moves while changing a viewing direction in the three-dimensional space, and a display control step for displaying, on display means, the image data pieces selected in the image selecting step in an order according to the orbit.

A program according to the present invention causes a computer to function as information obtaining means for obtaining content stored in storage means that stores a plurality of image data pieces and photograph information in association with one another, the plurality of image data pieces being generated by photographing an object from a plurality of photographing positions that are different from one another in photographing directions, and the photograph information being related to the photographing positions of the respective image data pieces in a three-dimensional space, image selecting means for selecting some of the image data pieces based on the photograph information of the respective image data pieces and orbit information relating to an orbit of a viewpoint that moves while changing a viewing direction in the three-dimensional space, and display control means for displaying, on display means, the image data pieces selected by the image selecting means in an order according to the orbit.

An information storage medium according to the present invention is a computer-readable information storage medium that stores the program described above.

In an embodiment of the present invention, the display control system further includes orbit obtaining means for obtaining the orbit information based on three-dimensional coordinates designated by a user.

In an embodiment of the present invention, the display control system further includes feature point detecting means for detecting three-dimensional coordinates of a plurality of feature points regarding the object based on at least one of the image data pieces, and the orbit obtaining means obtains the orbit information based on three-dimensional coordinates of a feature point designated by the user among from the plurality of feature points.

In an embodiment of the present invention, the orbit obtaining means obtains the orbit information about the viewpoint that moves while fixating on the three-dimensional coordinates of the feature point designated by the user.

In an embodiment of the present invention, the display control system further includes photograph determining means for determining whether the feature point designated by the user is photographed in the respective image data pieces based on the image data pieces, and the image selecting means selects some of the image data pieces based on the photograph information of the respective image data pieces, the orbit information, and a determination result of the photograph determining means.

In an embodiment of the present invention, the photograph information of the respective image data pieces includes photographing position information of the respective image data pieces, the orbit information includes orbit position information of the viewpoint, and the image selecting means selects some of the image data pieces based on distances among positions indicated by the photographing position information of the respective image data pieces and positions indicated by the orbit position information.

In an embodiment of the present invention, the photograph information of the respective image data pieces includes photographing direction information of the respective image data pieces, the orbit information includes viewing direction information about the viewpoint from the orbit, and the image selecting means selects some of the image data pieces based on deviations among directions indicated by the photographing direction information of the respective image data pieces and directions indicated by the viewing direction information.

In an embodiment of the present invention, the image selecting means includes means for calculating evaluation values weighing the deviations more than the distances based on the distances and the deviations of the respective image data pieces, and selects some of the image data pieces based on the evaluation values of the respective image data pieces.

In an embodiment of the present invention, the photograph information of the respective image data pieces includes the photographing position information of the respective image data pieces, and the image selecting means selects some of the image data pieces such that the distances of the positions indicated by the photographing position information of the respective image data pieces selected by the image selecting means are within a predetermined range based on the photographing position information of the respective image data pieces.

In an embodiment of the present invention, the display control means determines at least either of display positions and display sizes of the respective image data pieces selected by the image selecting means such that at least either of a deviation of the display position and a deviation of the display size of the object displayed on the display means is within a predetermined range.

Advantageous Effects of Invention

According to the present invention, it is possible to reduce labor of photographing images of an object in a case where the images of the object viewed from a viewpoint moving along with an orbit are displayed.

BRIEF DESCRIPTION OF DRAWINGS

FIG. 9 is a diagram showing an example of data stored in a photograph information database;

FIG. 10 is a diagram showing an example of data stored in a feature point database;

DESCRIPTION OF EMBODIMENTS

[1. Overall Configuration of Display Control System]

An embodiment of the present invention will be described below in detail with reference to the accompanying drawings. This embodiment is described by example of a case in which a bidder checks image data of an item exhibited by a seller in an Internet auction.

Figure 1:
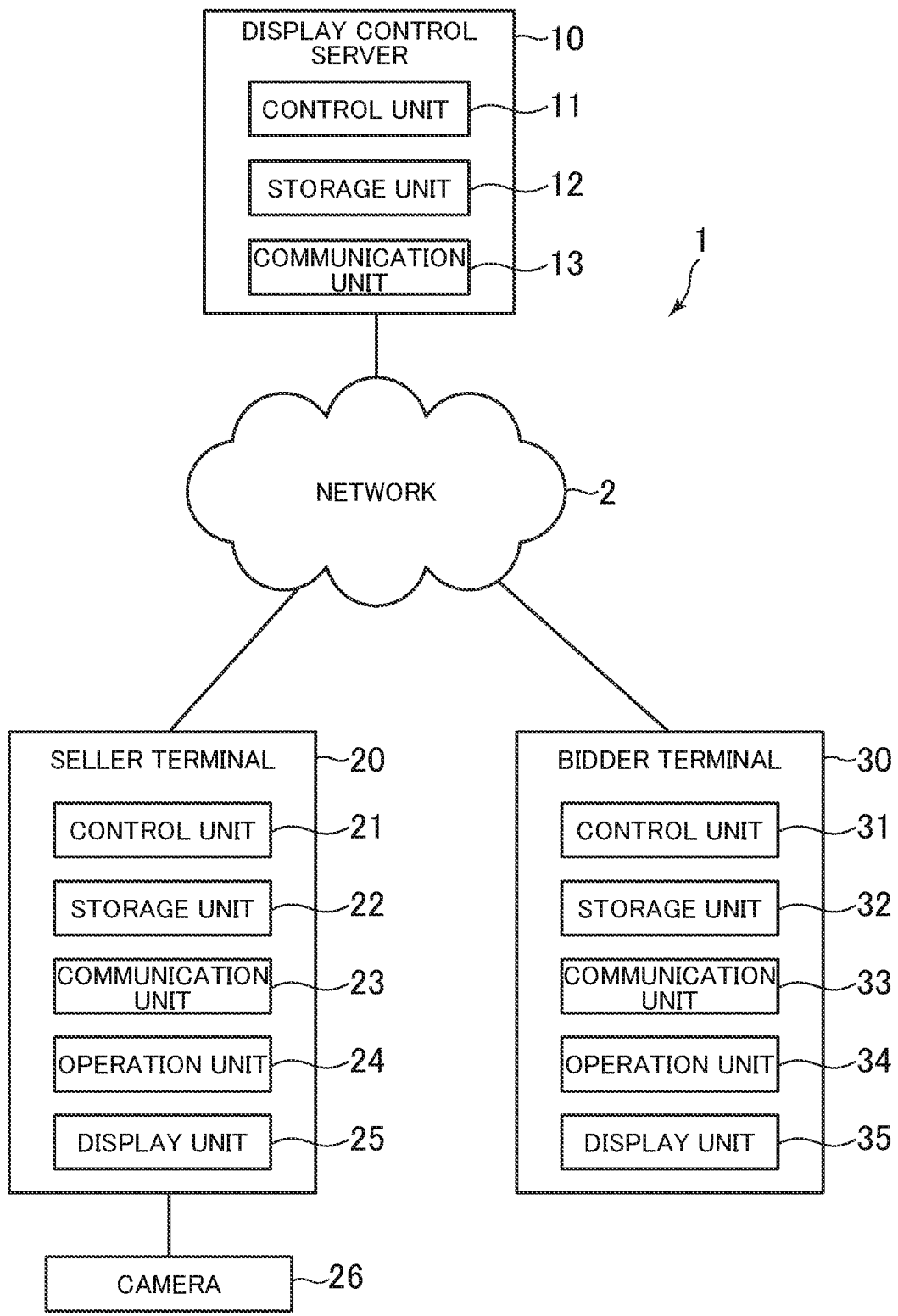
FIG. 1 is a diagram illustrating an overall configuration of a display control system of this embodiment.

FIG. 1 is a diagram illustrating an overall configuration of a display control system in this embodiment. As shown in FIG. 1, the display control system 1 includes a display control server 10 (display control device), a seller terminal 20, and a bidder terminal 30. The display control server 10, the seller terminal 20, and the bidder terminal 30 are connected to one another through a network 2 so that data are mutually transmitted and received.

The display control server 10 is a server computer. The display control server 10 includes a control unit 11, a storage unit 12, and a communication unit 13. The control unit 11 includes, for example, one or more microprocessors. The control unit 11 performs processing according to a program and data stored in the storage unit 12. The storage unit 12 includes a main storage unit and an auxiliary storage unit. For example, the main storage unit is a RAM, and the auxiliary storage unit is a hard disk or a solid-state drive. The communication unit 13 is a communication interface such as a network card. The communication unit 13 performs data communication through the network 2.

The seller terminal 20 is a computer operated by the seller, such as, a mobile phone (including smart phone), a portable information terminal (including tablet computer), or a personal computer. The seller terminal 20 includes a control unit 21, a storage unit 22, a communication unit 23, an operation unit 24, and a display unit 25. The control unit 21, the storage unit 22, and the communication unit 23 respectively share the same hardware configuration with the control unit 11, the storage unit 12, and the communication unit 13, and thus duplicated explanation will be omitted.

The operation unit 24 is an operating member for the seller to perform operation, and a pointing device such as a touch panel and a mouse. The operation unit 24 sends an operation of the seller to the control unit 21. The display unit 25 is, for example, a liquid crystal display unit or an organic EL display unit. The display unit 25 displays a screen as indicated by the control unit 21.

The seller terminal 20 is connected to a camera 26 through, for example, the communication unit 23. The camera 26 is photographing means for photographing an object and generating image data, and is, for example, a digital camera or a mobile terminal with camera (smart phone and tablet terminal). The camera 26 inputs image data into the seller terminal 20. The camera 26 may be included in the seller terminal 20.

The bidder terminal 30 is a computer operated by the bidder. The bidder terminal 30 includes a control unit 31, a storage unit 32, a communication unit 33, an operation unit 34, and a display unit 35. The bidder terminal 30 may share the same hardware configuration with the seller terminal 20. The control unit 31, the storage unit 32, the communication unit 33, the operation unit 34, and the display unit 35 may be the same as the control unit 21, the storage unit 22, the communication unit 23, the operation unit 24, and the display unit 25, respectively.

The program and the data are described as being stored in the storage unit 12, the storage unit 22, or the storage unit 32, but may be provided to the storage unit 12, the storage unit 22, or the storage unit 32 through the network 2. It is not necessary to be limited to the above-mentioned example, and, various types of computer hardware may be applied to the hardware configuration of the display control server 10, the seller terminal 20, and the bidder terminal 30. For example, the display control server 10, the seller terminal 20, and the bidder terminal 30 may each comprise a reader (e.g., optical disc drive and memory card slot) for reading a computer-readable information storage medium. In this case, a program or data stored in an information storage medium may be provided to the storage unit 12, the storage unit 22, or the storage unit 32 through a reader.

[2. Overview of Processing in Display Control System]

Next, overview of the processing performed in the display control system 1 will be discussed. In this embodiment, when the seller exhibits an item in an Internet auction, the seller photographs the item using the camera 26 in order to inform the bidder of a condition of the item.

Figure 2:
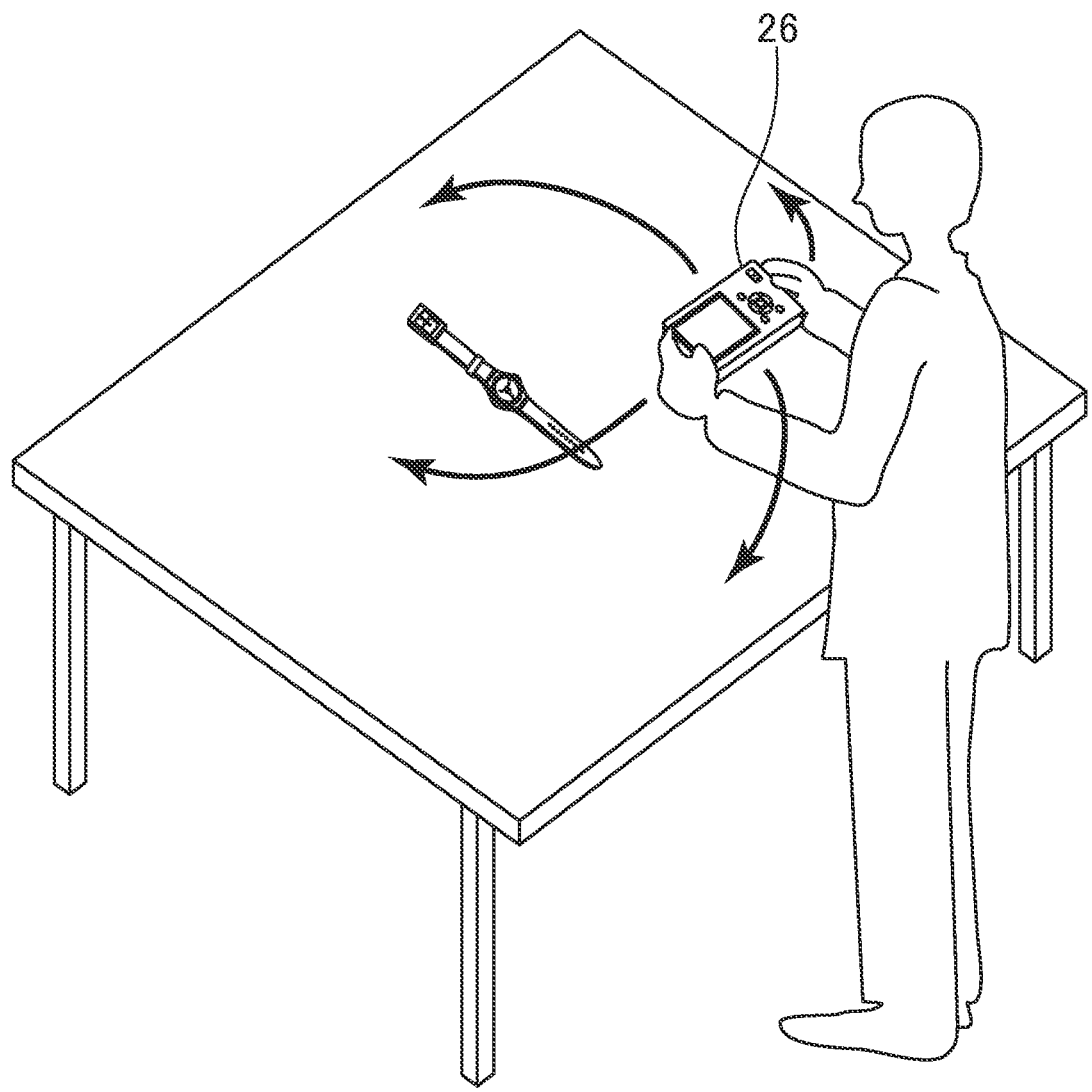
FIG. 2 is a diagram illustrating a manner in which an seller photographs an item.

FIG. 2 illustrates a scene in which the seller photographs an item. As shown in FIG. 2, the seller photographs the item with the camera 26 from various photographing positions while changing a positional relationship between the item and the camera 26. In other words, the seller photographs the item while changing photographing directions of the camera 26. The photographing direction is a direction toward a fixation point from the position of the camera 26, and also a direction to which a lens of the camera 26 is directed.

The seller may photograph the item in still image mode for generating an image data piece one by one, or in moving image mode for generating moving image data including multiple images. The seller uploads image data together with exhibition related information, such as a description of the item, thereby exhibiting the item in an Internet auction. The bidder displays an item screen for bidding the item on the display unit 35 of the bidder terminal 30.

Figure 3:
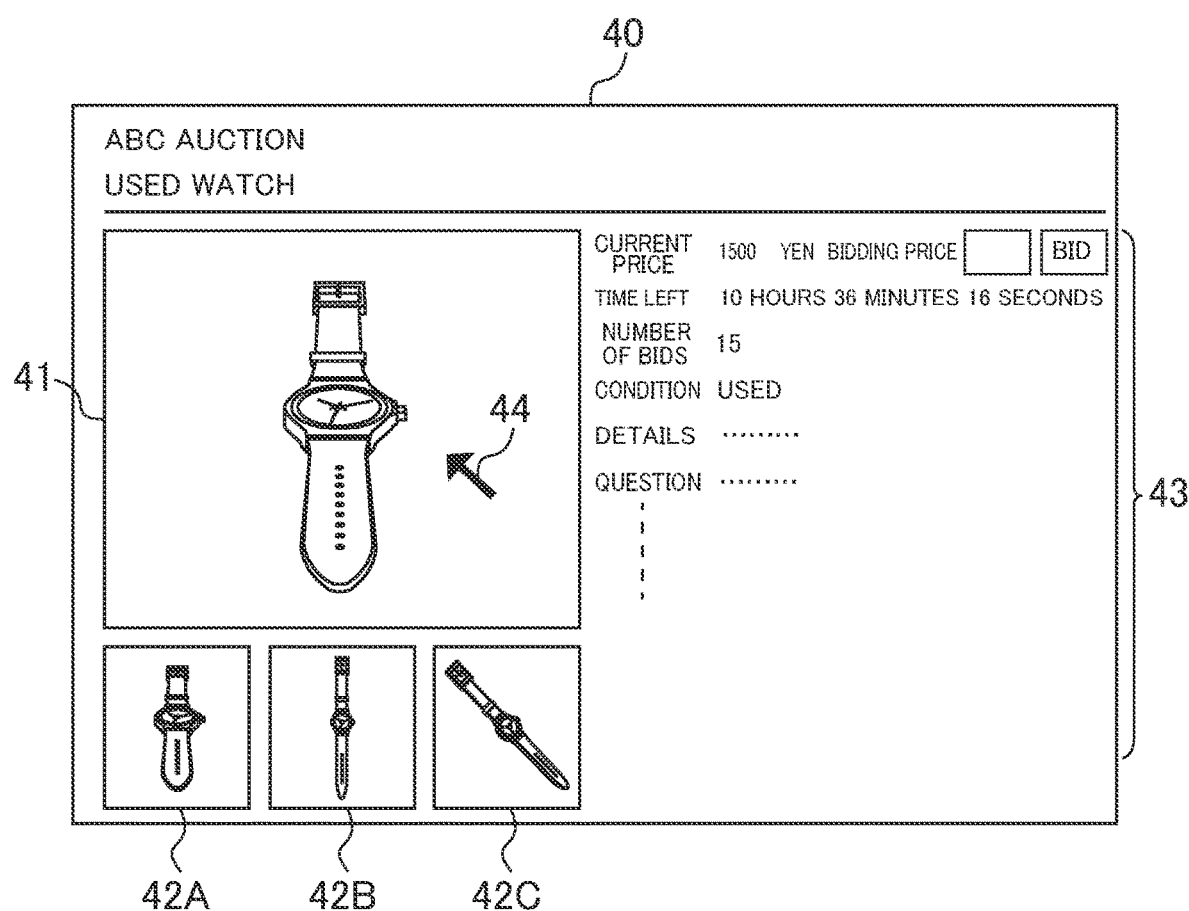
FIG. 3 is a diagram illustrating an example of an item screen.

FIG. 3 is a diagram illustrating an example of an item screen. As shown in FIG. 3, the item screen 40 displays an item image 41, thumbnail images 42A to 42C (hereinafter these are collectively referred to as thumbnail images 42), and biding related information 43, such as current price of the item. The item image 41 is one of the image data pieces uploaded by the seller. The thumbnail images 42 are generated by reducing the image data piece of the item image 41.

The bidder can change the image data piece displayed on the item image 41 by selecting one of the thumbnail images 42. Here, the image data piece indicated by the thumbnail image 42A is displayed in the item image 41. In this regard, thumbnail images 42 may be generated from all the image data pieces uploaded by the seller and displayed on the item screen 40, or generated from only some of the image data pieces and displayed on the item screen 40.

The bidder sees the item screen 40 to check the condition of the item. However, depending on the item image 41, it is sometimes unable to fully check the desired parts due to lighting or photographing positions. As such, in the display control system 1, when the bidder clicks on a part that the bidder especially wants to check in the item image 41 with a cursor 44, the item images 41 are continuously displayed as if the camera 26 moves while fixating on such part.

Figure 4:
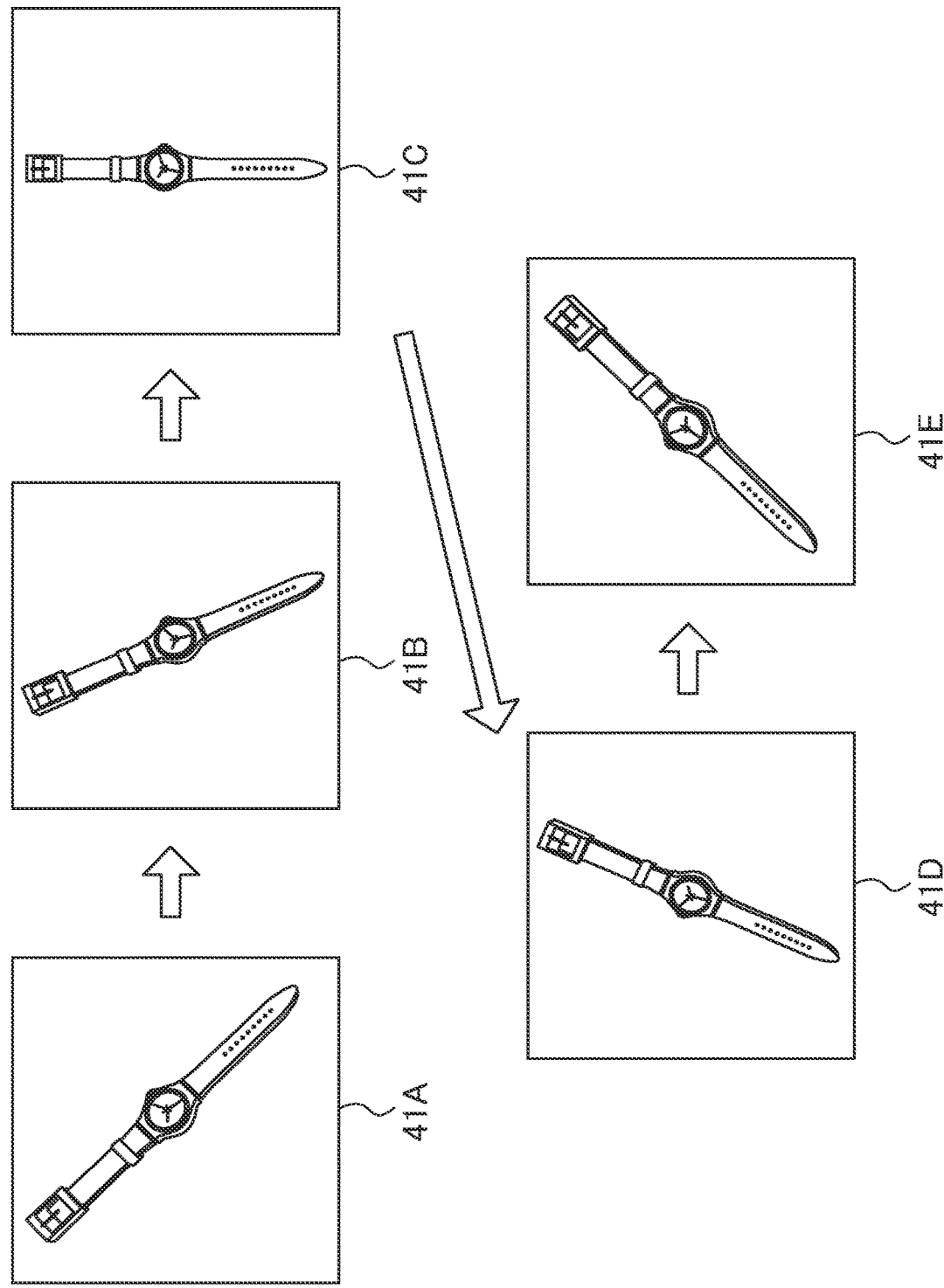
FIG. 4 is a diagram illustrating a manner in which item images are continuously displayed.

FIG. 4 is a diagram illustrating a scene in which the item images 41 are continuously displayed. Here, a watch is exhibited as an example of an item, and FIG. 4 shows a case where the bidder clicks on a dial plate of the watch in the item image 41. As shown in FIG. 4, for example, the item images 41A to 41E are continuously displayed as if the camera 26 moves from left to right viewed from the front while fixating on the dial plate. In this way, the bidder can check the condition of the dial plate of the watch from various directions. In the following, details of the processing will be discussed.

[3. Functions Implemented in Display Control System]

Figure 5:
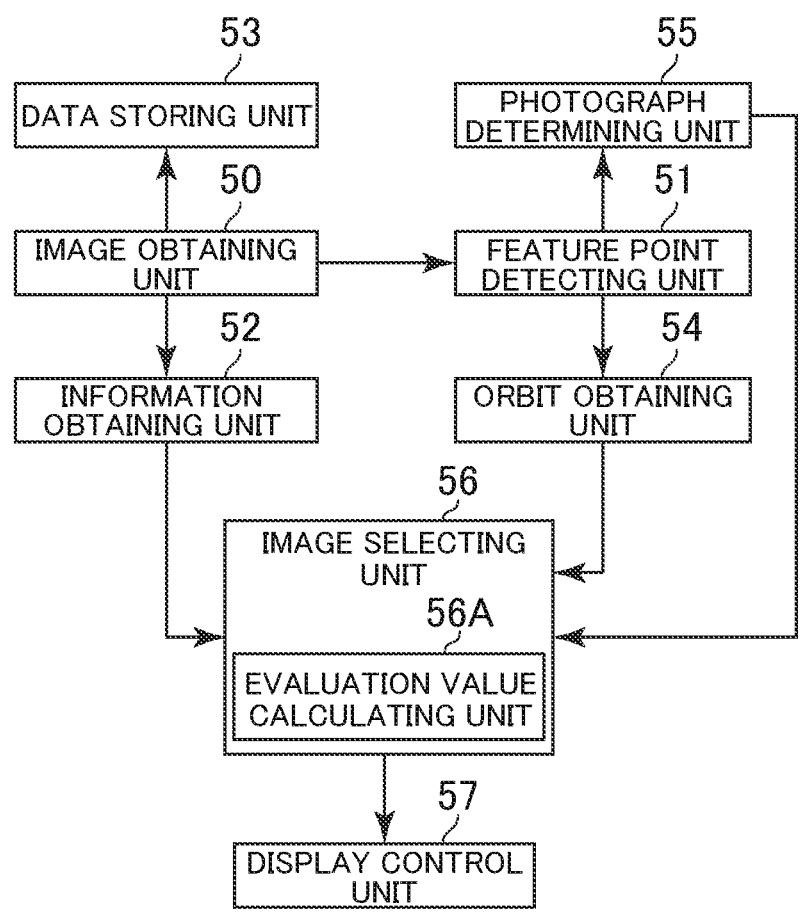
FIG. 5 is a block diagram showing an example of functions implemented in the display control system.

FIG. 5 is a functional block diagram showing an example of functions implemented in the display control system 1. As shown in FIG. 5, in the display control system 1, an image obtaining unit 50, a feature point detecting unit 51, an information obtaining unit 52, a data storing unit 53, an orbit obtaining unit 54, a photograph determining unit 55, an image selecting unit 56, and a display control unit 57 are implemented. In this embodiment, a case is explained in which these functions are implemented in the display control server 10. The image obtaining unit 50 is implemented mainly by the control unit 11 and the communication unit 13, the data storing unit 53 is implemented mainly by the storage unit 12, and other functions are implemented mainly by the control unit 11.

In this embodiment, the image obtaining unit 50, the feature point detecting unit 51, the information obtaining unit 52, the data storing unit 53, the orbit obtaining unit 54, the photograph determining unit 55, the image selecting unit 56, and the display control unit 57 respectively correspond to image obtaining means, feature point detecting means, information obtaining means, storage means, orbit obtaining means, photograph determining unit, image selecting means, and display control means according to the present invention.

[3-1. Image Obtaining Unit]

The image obtaining unit 50 obtains a plurality of image data pieces that are generated by photographing the item from photographing positions that have different photographing directions from one another. As explained previously with reference to FIG. 2, the photographing positions have different photographing directions to the item from one another. In this embodiment, the camera 26 generates each image data piece and inputs the generated image data piece into the seller terminal 20. As such, the image obtaining unit 50 receives the plurality of image data pieces sent from the seller terminal 20 through the network 2. The image obtaining unit 50 provides an image data piece with an image data ID, by which to uniquely identify the image data piece, and stores the image data piece in the data storing unit 53.

When the camera 26 photographs an item in the moving image mode, the image obtaining unit 50 may obtain a plurality of image data pieces based on the moving image data. In this case, the image obtaining unit 50 extracts one of frames in the moving image data as one image data piece. In this case, the image obtaining unit 50 may extract image data pieces at predetermined frame intervals, or extract image data pieces for all of the frames.

[3-2. Feature Point Detecting Unit]

The feature point detecting unit 51 detects a plurality of feature points (in this embodiment, both of two-dimensional coordinates and three-dimensional coordinates) of the item based on a plurality of image data pieces. A feature point is a spot that is identifiable on the surface of the object by the computer, and for example, an outline or a corner of the object. The feature point is also described as an interest point or a vertex. Here, the feature point detecting unit 51 detects feature points in every image data piece obtained by the image obtaining unit 50.

For example, the feature point detecting unit 51 extracts feature points using a corner detection method. As a corner detecting method, for example, Moravec corner detection or Harris corner detection may be used. For example, the feature point detecting unit 51 sets pixels in an image data piece as target pixels, detects an outline of the object from the difference between pixel values of the target pixels and peripheral pixels, and detects positions at the outline as feature points.

In this embodiment, the feature point detecting unit 51 labels feature points detected from each image data piece. For example, the feature point detecting unit 51 matches feature points of respective image data pieces, and determines if a feature point is a newly detected feature point or the same as the already detected feature point. The feature points may be matched based on pixel values of the feature points or positional relationship with other feature points. When a new feature point is detected from an image data piece, the feature point detecting unit 51 provides the feature point with a feature point ID to identify the feature point. When the same feature point as the already detected feature point is detected, the feature point detecting unit 51 does not provide the feature point with a feature point ID.

Here, the feature point detecting unit 51 stores, for every image data piece, feature point IDs of feature points detected from an image data piece and positions (two-dimensional coordinates in a screen coordinates system) of the feature points in the image in the data storing unit 53. The information obtaining unit 52 described below uses two-dimensional coordinates of each feature point in order to obtain photograph information. The feature point detecting unit 51 also calculates three-dimensional coordinates of each feature point, and stores them in the data storing unit 53, as subsequently described in detail.

For a detecting method of a feature point from image data, various known methods for detecting feature points can be applied. For example, the feature point detecting unit 51 may specify an area in the same color in an image data piece using blob analysis and determine the center of the area as a feature point, or detect a pixel of a predetermined pixel value (i.e., a pixel of a specified color) as a feature point. Alternatively, for example, the feature point detecting unit 51 may detect an entire outline of an object as a feature point.

[3-3. Information Obtaining Unit]

The information obtaining unit 52 obtains photograph information regarding a photographing position of each image data piece in a three-dimensional space based on a plurality of image data pieces. The photograph information comprises at least one of photographing position information and photographing direction information of an image data piece. The photographing position information is three-dimensional coordinates indicating a photographing position of an image data piece. The photographing direction information is vector information indicating a photographing direction of an image data piece or three-dimensional coordinates indicating a fixation point. Here, a case will be explained in which photographing direction information is vector information.

The information obtaining unit 52 obtains photograph information for each image data piece by analyzing each image data piece. Here, as an example of a method for obtaining photograph information, a method for using positional relationship of feature points will be discussed.

For example, assume that a seller photographs an item with a camera 26 at a reference photographing position in a reference photographing direction. In the following, an image data piece obtained in this way is referred to as a reference image data piece. For example, the reference image data piece is photographed from a position at a predetermined distance away from the item in a front direction. The reference photographing position and the reference photographing direction may be determined in advance. The information obtaining unit 52 first obtains the reference photographing position and the reference photographing direction in a three-dimensional space.

Figure 6:
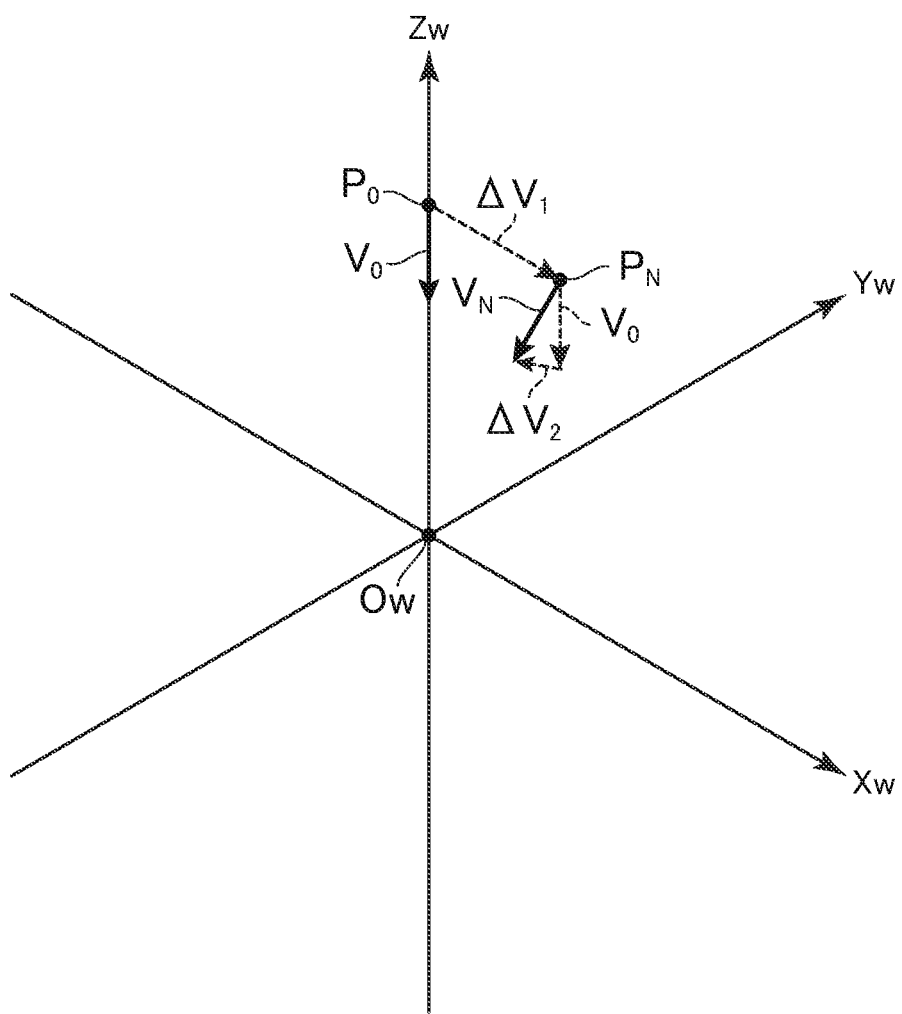
FIG. 6 is a diagram illustrating a three-dimensional space.

FIG. 6 is a diagram illustrating a three-dimensional space. As shown in FIG. 6, three axes ($X_W$ axis, $Y_W$ axis, $Z_W$ axis) perpendicular to one another are set in the three-dimensional space. The information obtaining unit 52 obtains a photographing position $P_0$, which is away from the origin $O_W$ in a predetermined direction (here, $Z_W$ axis positive direction) by a predetermined distance, as a reference photographing position. The information obtaining unit 52 then obtains a photographing direction $V_0$, which indicates a negative direction of the $Z_W$ axis, as a reference photographing direction.

The information obtaining unit 52 calculates photograph information of an image data piece based on positional relationship among two-dimensional coordinates of respective feature points of the image data piece and two-dimensional coordinates of respective feature points of the reference image data piece. For example, the information obtaining unit 52 calculates a photographing position $P_N$ and a photographing direction $V_N$ (N is a natural number) of an image data piece based on deviations of two-dimensional coordinates of respective feature points.

Figure 7:
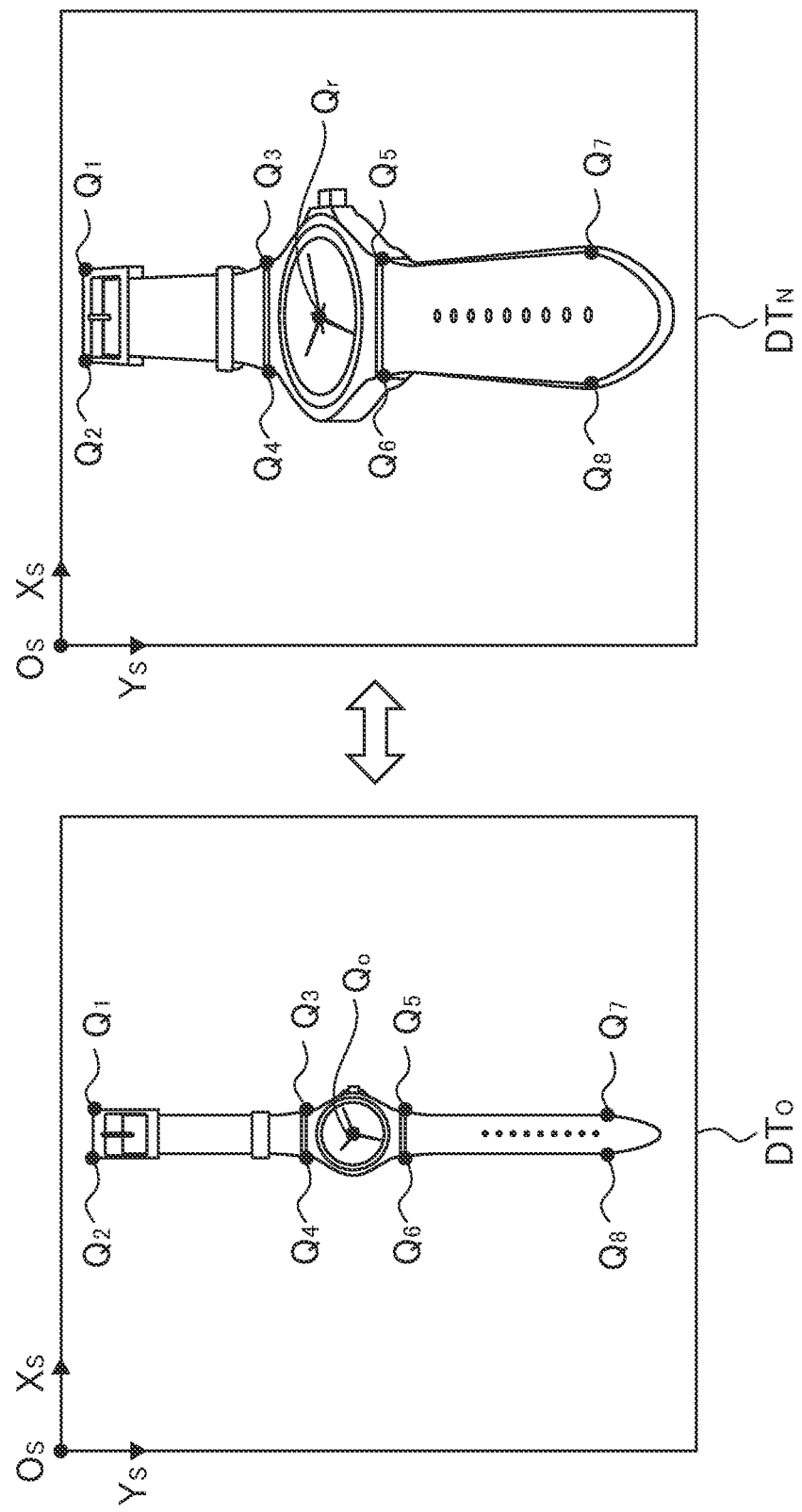
FIG. 7 is a diagram showing a comparison of two-dimensional coordinates of feature points.

FIG. 7 is a comparison of two-dimensional coordinates of feature points. In FIG. 7, the reference image data piece is "$DT_0$", the image data piece to obtain the photograph information is "$DT_N$", and each feature point is shown as $Q_K$ (K is a natural number and K=0 to 8 in FIG. 7). The information obtaining unit 52 obtains a vector connecting two-dimensional coordinates of respective feature points $Q_K$ in the reference image data piece $DT_0$ to two-dimensional coordinates of respective feature points $Q_K$ in the image data piece $DT_N$ and performs predetermined matrix operations, thereby calculating a vector $\Delta V_1$ indicating a deviation between the photographing positions $P_0$ and $P_N$ and a vector $\Delta V_2$ indicating a deviation between the photographing directions $V_0$ and $V_N$.

Referring back to FIG. 6, the information obtaining unit 52 sets a position shifted by the vector $\Delta V_1$ from the photographing position $P_0$ as the photographing position $P_N$, and a direction shifted by the vector $\Delta V_2$ from the reference photographing direction $V_0$ as the photographing direction $V_N$. The information obtaining unit 52 performs the same calculation for each image data piece so as to calculate photograph information, and stores the information in the data storing unit 53.

When the information obtaining unit 52 obtains the photograph information, the feature point detecting unit 51 detects three-dimensional coordinates of the feature points $Q_K$ of the item based on at least one of the image data pieces. For example, the feature point detecting unit 51 calculates three-dimensional coordinates of the feature points $Q_K$ by coordinate-transforming the two-dimensional coordinates of the feature points $Q_K$ of the reference image data piece $DT_0$ based on the photographing position $P_0$ and the photographing direction $V_0$. The three-dimensional coordinates of respective feature points calculated by the feature point detecting unit 51 are stored in the data storing unit 53.

Figure 8:
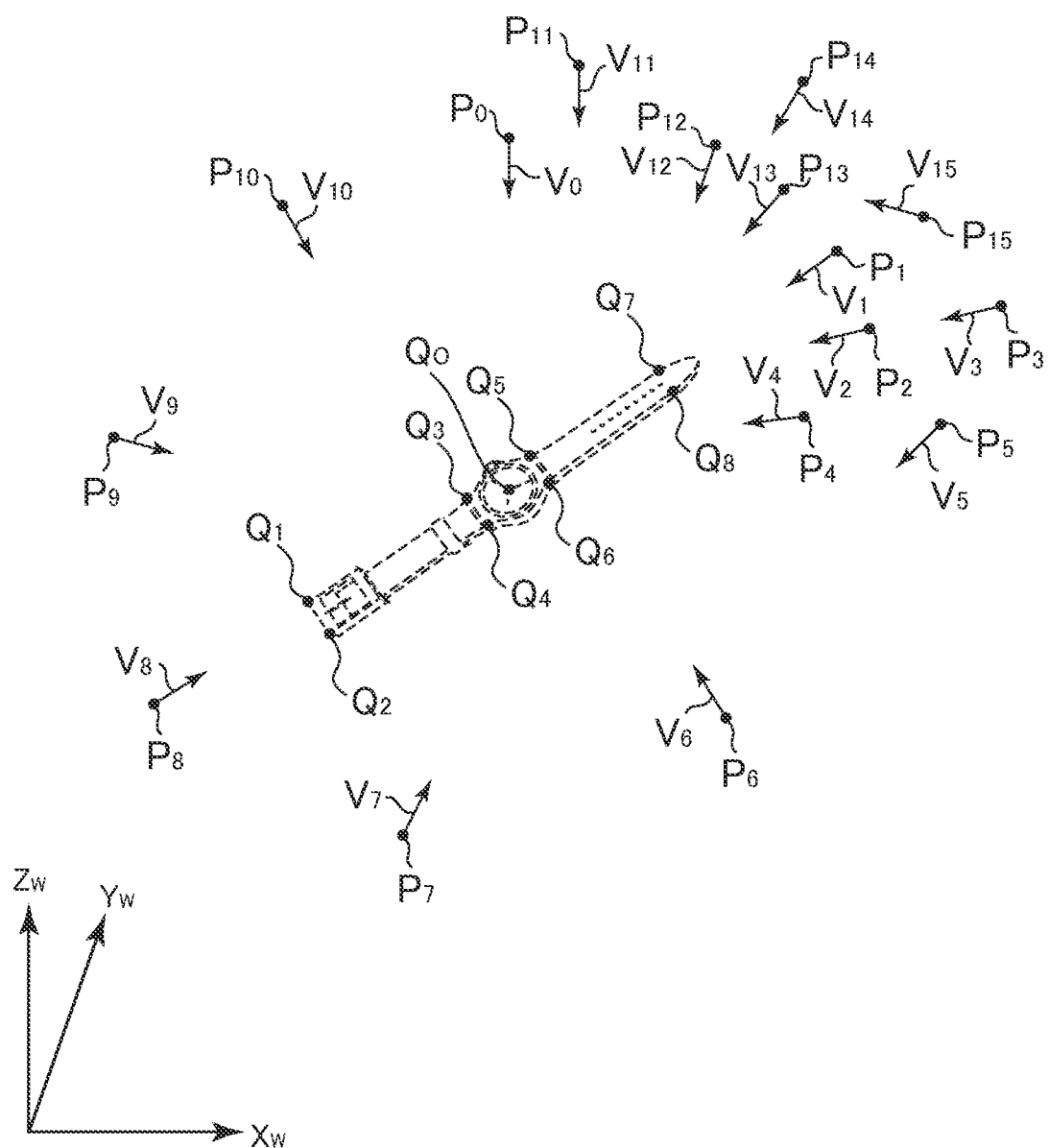
FIG. 8 is a diagram illustrating relationship among feature points and photograph information in the three-dimensional space.

FIG. 8 is a diagram representing relationship among feature points and photograph information in the three-dimensional space. For example, in a case where 16 image data pieces including the reference image data piece are uploaded, as shown in FIG. 8, the information obtaining unit 52 obtains photographing positions $P_0$ to $P_{15}$ and photographing directions $V_0$ to $V_{15}$ of respective image data pieces, and the feature point detecting unit 51 detects feature points $Q_0$ to $Q_8$. The positional relationship among the photographing positions $P_0$ to $P_{15}$ and the photographing directions $V_0$ to $V_{15}$ with respect to the feature points $Q_0$ to $Q_8$ corresponds to the positional relationship among the photographing positions and the photographing directions of the camera 26 when the item was photographed by the bidder.

For a method of obtaining photograph information, various known methods can be applied. For example, the photograph information may be obtained not by using the reference image data piece, but by comparing image data pieces. Alternatively, for example, the display control server 10 may prepare an image data piece indicating a reference shape of the object in advance, and estimate the photograph information by detecting differences from the reference shape in size and direction.

[3-4. Data Storing Unit]

The data storing unit 53 stores various kinds of data necessary for displaying the item screen 40. For example, the data storing unit 53 stores image data pieces obtained by the image obtaining unit 50 in association with respective image data IDs. Further, the data storing unit 53 stores a photograph information database in which the photograph information obtained by the information obtaining unit 52 is stored and a feature point database in which the three-dimensional coordinates of the feature points $Q_K$ calculated by the feature point detecting unit 51 are stored.

FIG. 9 is a diagram illustrating an example of data stored in the photograph information database. As shown in FIG. 9, the photograph information database stores image data IDs, photograph information (photographing positions $P_N$ and photographing directions $V_N$), and feature point IDs in association with one another. Here, the feature point IDs indicate the feature points detected in the image data pieces having the image data IDs among all of the feature points. For example, all of feature points $Q_0$ to $Q_8$ are detected in the reference image data piece having an image data ID "0", and the feature point $Q_6$ is not detected in the image data piece having an image data ID "2" due to, for example, reflection of light. Although omitted in FIG. 9, two-dimensional coordinates of feature points in image data pieces may be stored in association with feature point IDs.

FIG. 10 is a diagram illustrating an example of data stored in the feature point database. As shown in FIG. 10, the feature point database stores feature point IDs and three-dimensional coordinates of feature points $Q_K$ in association with one another. In this embodiment, three-dimensional coordinates of feature points $Q_K$ are the same in respective image data pieces, and thus are stored in the feature point database, and two-dimensional coordinates of feature points $Q_K$ differ for respective image data pieces, and thus are stored in the photograph information database.

The data storing unit 53 may store data other than described above. For example, the data storing unit 53 may store data of thumbnail images of image data pieces, exhibition related information, and biding related information. Further, the information obtaining unit 52 may be capable of obtaining content stored in the data storing unit 53.

[3-5. Orbit Obtaining Unit]

The orbit obtaining unit 54 obtains orbit information regarding an orbit of a viewpoint that moves while changing a viewing direction in the three-dimensional space based on at least either of the bidder's operation and the orbit calculation algorithm. The orbit calculation algorithm is written in a program, and includes a numerical expression for calculating the orbit. The orbit may be determined only by the bidder's operation, or only by the orbit calculation algorithm, although in this embodiment, a case in which the orbit is determined based on both of these cases will be discussed.

The viewpoint in the three-dimensional space is a viewpoint on the item screen 40 (i.e., a viewpoint on a viewer), and also can be described as a virtual camera in the three-dimensional space. The orbit of the viewpoint is a change in the position of the viewpoint or the viewing direction. The orbit of the viewpoint has a start point and an end point. The start point and the end point may be different positions from each other, or the same position. The orbit of the viewpoint may be described as a path moving from the start point to the end point.

The orbit information includes at least either of orbit position information of the viewpoint and viewing direction information of the viewpoint from the orbit. In this embodiment, the orbit information includes both of the orbit position information and the viewing direction information, but may include only one of them.

The orbit position information indicates changes in positions of the viewpoint in the three-dimensional space. For example, the orbit position information may include three-dimensional coordinates of each position on the orbit, or a numerical expression indicating the orbit. The viewing direction information indicates changes in viewing directions in the three-dimensional space. For example, the viewing direction information may include vectors indicating viewing directions of respective positions on the orbit, or three-dimensional coordinates indicating fixation points at the respective positions.

In this embodiment, the orbit obtaining unit 54 obtains the orbit information based on the three-dimensional coordinates designated by the bidder. For example, the orbit obtaining unit 54 obtains the orbit information based on the three-dimensional coordinates of the feature point $Q_K$ designated by the bidder among the plurality of feature points $Q_K$. The bidder designates a position in the item image 41 on the item screen 40, thereby designating the feature point $Q_K$.

Here, an example is explained in which the image data piece having an image data ID "1" is displayed in the item image 41, and the bidder designates a part around the dial plate in the item image 41. The orbit obtaining unit 54 obtains the two-dimensional coordinates designated by the bidder, and specifies the feature point $Q_K$ in the vicinity thereof. Here, the orbit obtaining unit 54 specifies the feature point $Q_0$ assuming that the bidder designated the feature point $Q_0$ on the dial plate of the watch. Then, the orbit obtaining unit 54 calculates the orbit information based on the photograph information of the image data piece and the specified feature point $Q_0$.

Figure 11:
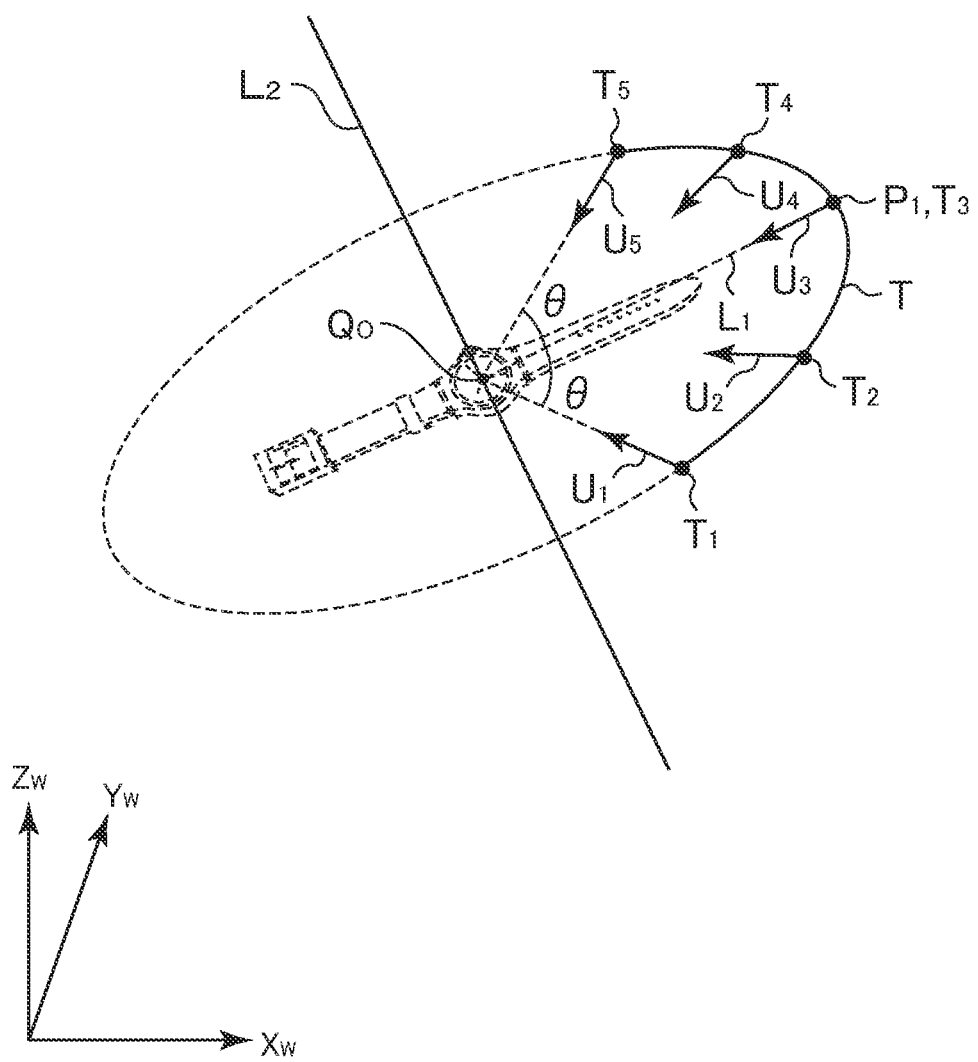
FIG. 11 is a diagram explaining a calculating method of orbit information.

FIG. 11 is a diagram for explaining a calculating method of orbit information. The calculating method described below is defined in the orbit calculation algorithm. The orbit obtaining unit 54 first calculates a rotation axis $L_2$ perpendicular to a line $L_1$ connecting the photographing position $P_1$ of the image data piece having the image data ID "1" to the feature point $Q_0$. As shown in FIG. 11, the rotation axis $L_2$ passes through the feature point $Q_0$. The orbit obtaining unit 54 calculates orbit T through which the photographing position $P_1$ passes when the photographing position $P_1$ is rotated by a predetermined angle θ left and right (horizontal direction when the feature point $Q_0$ is viewed from the photographing position $P_1$) with the rotation axis $L_2$ as a reference.

Although there are a plurality of straight lines that are perpendicular to the line $L_1$ and pass through the feature point $Q_0$, any one of these straight lines may be defined as the rotation axis $L_2$. For example, the orbit obtaining unit 54 may determine the rotation axis $L_2$ based on a direction designated by the bidder in the three-dimensional space. For example, the bidder uses the operation unit 34 to designate a direction in which the photographing position $P_1$ rotates. The orbit obtaining unit 54 then specifies the rotation axis $L_2$ perpendicular to the direction designated by the bidder. For example, in a case where the bidder designates a horizontal direction when the feature point $Q_0$ is viewed from the photographing position $P_1$, as shown in FIG. 11, the orbit obtaining unit 54 specifies the rotation axis $L_2$ that is perpendicular to the line $L_1$, passes through the feature point $Q_0$, and is perpendicular to the horizontal direction designated by the bidder. The orbit obtaining unit 54 may specify the rotation axis $L_2$ based not on the direction designated by the bidder, but on the predetermined direction. When the predetermined direction is a horizontal direction, as shown in FIG. 11, the orbit obtaining unit 54 specifies the rotation axis $L_2$ that is perpendicular to the line $L_1$, passes through the feature point $Q_0$, and is perpendicular to the horizontal direction, which is the predetermined direction.

For example, the orbit position information includes three-dimensional coordinates of a plurality of points $T_M$ (M is a natural number, and M=1 to 5 in FIG. 11) on the orbit T. Here, point $T_1$ is a start point and point $T_5$ is an end point. Each point $T_M$ is a position of a viewpoint in the three-dimensional space, and the orbit T is a path in which the viewpoint moves from the point $T_1$ to the point $T_5$. The orbit obtaining unit 54 calculates a viewing direction $U_M$ of a viewpoint for each point $T_M$. Here, viewing directions $U_1$ to $U_5$ are directions respectively setting the feature point $Q_0$ as the fixation point from the points $T_1$ to $T_5$. The viewing direction information includes vector information of the calculated viewing directions $U_M$.

As described above, the orbit obtaining unit 54 obtains the orbit information of the viewpoint that moves in a way that the viewpoint is fixed on the three-dimensional coordinates of the feature point $Q_0$ designated by the bidder. In this regard, "the viewpoint that moves in a way that the viewpoint is fixed" means that the viewpoint changes its position (in FIG. 11, from point $T_1$ to point $T_5$) while the fixation point of the viewpoint is kept at the feature point $Q_0$. In other words, the viewpoint changes its position while keeping the state in which the range of the viewpoint includes the feature point $Q_0$.

[3-6. Photograph Determining Unit]

The photograph determining unit 55 determines whether the feature point $Q_K$ designated by the bidder is photographed in each image data piece based on the image data pieces. The photograph determining unit 55 refers to the photograph information database and determines whether the feature point $Q_K$ designated by the bidder is detected in respective image data pieces.

The photograph determining unit 55 may specify an area occupied by the item in the three-dimensional space, and determine whether the area is comprised in the photographing range of the image data piece. In this case, the photograph determining unit 55 first specifies the area occupied by the item in the three-dimensional space based on the three-dimensional coordinates of the feature points $Q_K$. For example, the photograph determining unit 55 specifies the interior of the three-dimensional space obtained by connecting each of the feature points $Q_K$ as the area occupied by the item. The photograph determining unit 55 then determines whether the area occupied by the item is included in a visual field calculated based on photographing positions $P_N$ and photographing directions $V_N$ of respective image data pieces. The visual field is an area defined by a photographing position $P_N$, a photographing direction $V_N$, and a viewing angle (field angle). The viewing angle may be determined in advance, or calculated by analyzing an image data piece.

[3-7. Image Selecting Unit]

The image selecting unit 56 selects some of image data pieces based on photograph information of respective image data pieces and orbit information about an orbit T when a viewpoint in the three-dimensional space moves while changing a viewing direction. The image data pieces selected by the image selecting unit 56 are image data pieces that relate to the orbit information and should be displayed on the item screen 40. The image selecting unit 56 selects the image data pieces based on differences (positional relationship) between the photograph information of respective image data pieces and the orbit information obtained by the orbit obtaining unit 54.

For example, the image selecting unit 56 selects some of the image data pieces based on distances $D_N$ between photographing positions $P_N$ indicated by the photographing position information of respective image data pieces and positions $T_M$ indicated by the orbit position information. For example, the image selecting unit 56 selects some of the image data pieces based on deviations $θ_N$ among photographing directions $V_N$ indicated in the photographing direction information of respective image data pieces and viewing directions $U_M$ indicated in the viewing direction information. The deviation $θ_N$ may represent a directional deviation, for example, an angle or a vector.

In this embodiment, a case is explained in which the image selecting unit 56 includes an evaluation value calculating unit 56A that calculates evaluation values $E_N$ obtained by weighting deviations $\theta_N$ more than distances $D_N$ based on distances $D_N$ and deviations $\theta_N$ of respective image data pieces, and selects some of the image data pieces based on the evaluation values $E_N$ of the respective image data pieces. The evaluation value calculating unit 56A corresponds to means for calculating evaluation values according to the present invention.

Figure 12:
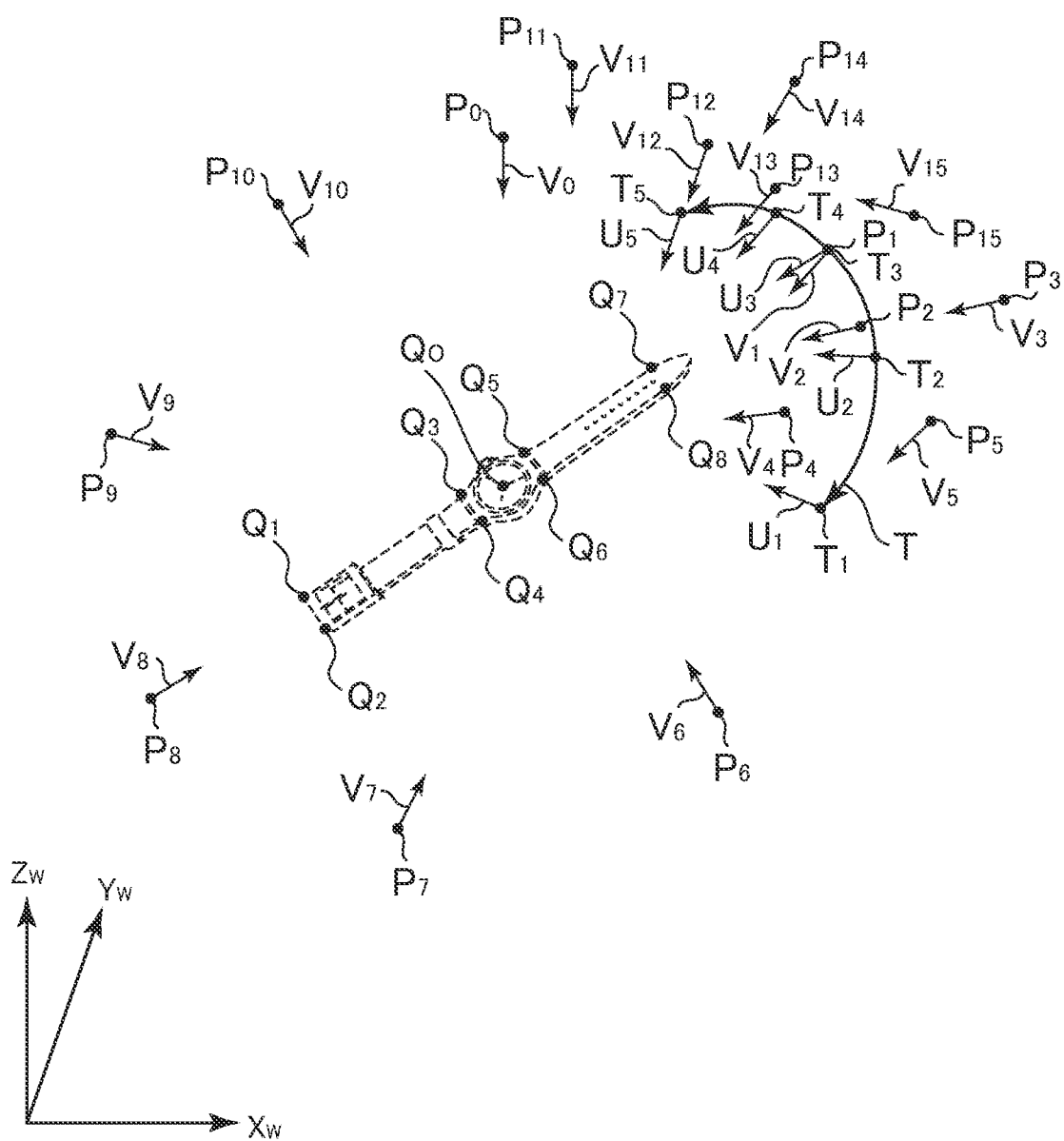
FIG. 12 is a diagram illustrating relationship among photographing positions and photographing directions of image data pieces and an orbit.

FIG. 12 is a diagram representing relationship among photographing positions $P_N$ and photographing directions $V_N$ of respective image data pieces, and the orbit T. For example, the evaluation value calculating unit 56A calculates distances $D_0$ to $D_{15}$ between each of photographing positions $P_0$ to $P_{15}$ and the orbit T. Here, the orbit information stores three-dimensional coordinates of points $T_1$ to $T_5$ on the orbit T. As such, the evaluation value calculating unit 56A calculates the distances $D_0$ to $D_{15}$ between each of the photographing positions $P_0$ to $P_{15}$ and the nearest point among the points $T_1$ to $T_5$.

The evaluation value calculating unit 56A calculates deviations $\theta_0$ to $\theta_{15}$ among the photographing directions $V_0$ to $V_{15}$ and the viewing directions $U_1$ to $U_5$ from the orbit T. Here, the orbit information stores the viewing directions $U_1$ to $U_5$ from the respective points $T_1$ to $T_5$ on the orbit T. As such, the evaluation value calculating unit 56A calculates the deviations $\theta_0$ to $\theta_{15}$ between each of photographing positions $P_0$ to $P_{15}$ and the nearest direction among the viewing directions $U_1$ to $U_5$.

The evaluation value calculating unit 56A substitutes the distances $D_N$ and deviations $\theta_N$ calculated as described above for numerical expressions, thereby calculating evaluation values $E_N$ of respective image data pieces. The evaluation value $E_N$ may be described as similarity between the photograph information and the orbit information. In other words, the evaluation value $E_N$ may be described as an index value indicating whether an image data piece should be displayed. Here, when a numerical value of an evaluation value $E_N$ is higher, the photograph information and the orbit information have more similarities. That is, when a numerical value of an evaluation value $E_N$ is higher, a degree to display an image data piece gets higher.

The numerical expressions used for calculating evaluation values $E_N$ are written in the program. For example, the evaluation value calculating unit 56A calculates an evaluation value $E_N$ by substituting a distance $D_N$ and a deviation $\theta_N$ for the following expression 1. As indicated in the expression 1, when the distance $D_N$ and the deviation $\theta_N$ are smaller, the evaluation value $E_N$ is greater. In the expression 1, a coefficient of the distance $D_N$ is greater than a coefficient of the deviation $\theta_N$. That is, the deviation $\theta_N$ is weighted more than the distance $D_N$.

$$E_N = C_D*(D_{MAX} - D_N) + C_\theta*(\theta_{MAX} - \theta_N) \quad \text{(Expression 1)}$$

$C_D, C_\theta$: predetermined coefficient. Here, $C_D < C_\theta$.
$D_{MAX}$: predetermined maximum value of distance $D_{NM}$.
$\theta_{MAN}$: predetermined maximum value of deviation $\theta_{NM}$.

In a case of positional relationship shown in FIG. 12, for example, the image data pieces at the photographing positions $P_0$ and $P_6$ to $P_{11}$ have large distances $D_0$ and $D_6$ to $D_{11}$ and large deviations $\theta_0$ and $\theta_6$ to $\theta_{11}$, and thus evaluation values $E_0$ and $E_6$ to $E_{11}$ are small. On the other hand, at least either of the distances $D_6$ to $D_{11}$ and the deviations $\theta_6$ to $\theta_{11}$ of the image data pieces at the photographing positions $P_1$ to $P_5$ and $P_{12}$ to $P_{15}$ are small, and thus the evaluation values $E_1$ to $E_5$ and $E_{12}$ to $E_{15}$ are relatively large. In this regard, although the photographing positions $P_2$ and $P_3$ are photographed from the similar directions, the photographing position $P_2$ is closer to the orbit T, and thus the evaluation value $E_2$ is larger than the evaluation value $E_3$. Further, although between the photographing positions $P_4$ and $P_5$, $P_5$ is closer to the reference orbit T, the photographing direction $V_5$ is remarkably deviated from the reference viewing direction $U_1$, and thus evaluation value $E_4$ is larger than the evaluation value $E_5$. The image selecting unit 56 obtains a predetermined number of image data pieces in descending order of evaluation values $E_N$. For example, the image selecting unit 56 selects five image data pieces at the photographing positions $P_4$, $P_2$, $P_1$, $P_{13}$, and $P_{12}$.

The calculating method of evaluation values $E_N$ is not limited to the above example. In this embodiment, the evaluation value $E_N$ may be calculated by assigning more weights to the deviation $\theta_N$ than the distance $D_N$. For example, the evaluation value $E_N$ may be calculated using other numerical expressions. This embodiment describes a case in which, when an evaluation value $E_N$ is larger, a position $T_M$ of a viewpoint and a viewing direction $U_M$ have more similarities, although the way of using an evaluation value $E_N$ is not limited to this example. A position $T_M$ of a viewpoint and a viewing direction $U_M$ may have more similarities when an evaluation value $E_N$ is smaller. Similarities between a position $T_M$ of a viewpoint and a viewing direction $U_M$ may be determined in advance to be identifiable based on magnitudes of values. Further, an evaluation value $E_N$ may be represented not only by a numerical value but also a word or a symbol.

The image selecting unit 56 may select some of the image data pieces based on the photograph information and the orbit information of respective image data pieces and the determination result of the photograph determining unit 55. The image selecting unit 56 selects image data pieces in which the feature point ID of the feature point $Q_K$ designated by the bidder is stored as display target. For example, the image data pieces in which the feature point $Q_K$ designated by the bidder is photographed are kept as the display target, and the image data pieces in which the feature point $Q_K$ is not photographed are excluded from the display target. For example, when the bidder designates the feature point $Q_0$, the feature point $Q_0$ is not detected in the image data piece having the image data ID "7" in the example of data storage in FIG. 9 (e.g., when the entire dial plate is difficult to see due to reflections), and thus, such image data piece may be excluded from the display target in advance.

[3-8. Display Control Unit]

The display control unit 57 displays the image data pieces selected by the image selecting unit 56 on the display unit 35 in the order according to the orbit T. The order according to the orbit T is either of an order from the start point $T_1$ to the end point $T_5$ on the orbit T, and an order from the end point $T_5$ to the start point $T_1$ on the orbit T. The display control unit 57 provides the order to the image data pieces selected by the image selecting unit 56 in the order closer to the start point $T_1$ or the end point $T_5$. For example, in the above example of FIG. 12, the order of the image data IDs "4", "2", "1", "13", and "12" in the order closer to the viewpoint $T_1$ is the order according to the orbit.

For example, the display control unit 57 continuously displays (animation display) the image data pieces selected by the image selecting unit 56 in the order according to the orbit T. That is, the display control unit 57 displays the image data pieces selected by the image selecting unit 56 such that the image data pieces are switched in the order according to the orbit T. Here, the display control unit 57 continuously displays the image data pieces such that the image data pieces are switched in the order of the image data IDs "4", "2", "1", "13", and "12."

[4. Processing Executed in Display Control System]

Figure 13:
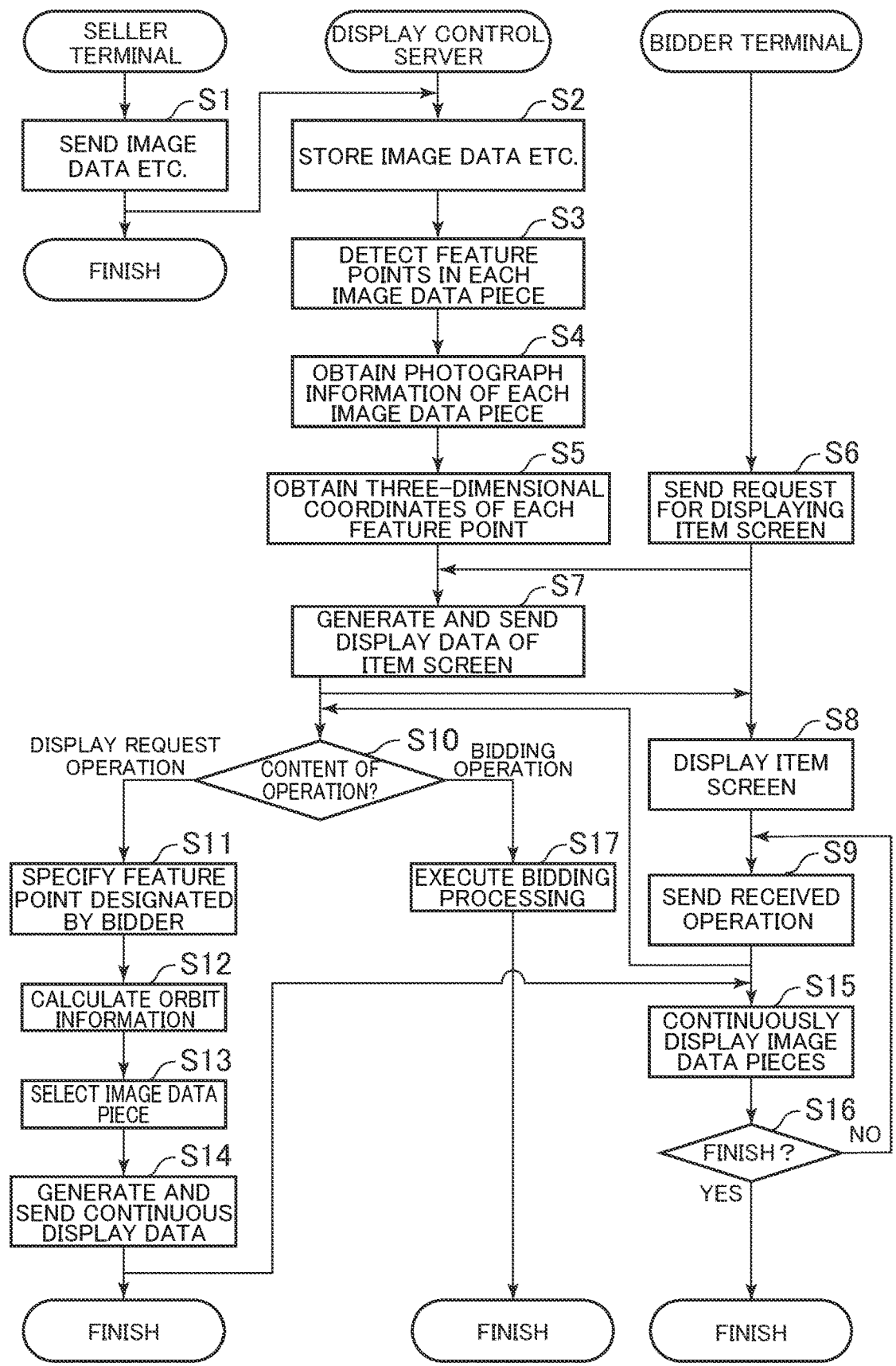
FIG. 13 is a flow chart showing an example of processing executed in the display control system.

FIG. 13 is a flow chart showing an example of processing executed in the display control system 1. The processing shown in FIG. 13 is executed when the control units 11, 21, and 31 respectively operate according to the programs stored in the storage units 12, 22, and 32. In this embodiment, when the processing described below is executed, the functional blocks in FIG. 5 are implemented. When the processing described below is executed, assume that the seller photographs an item with the camera 26 as shown in FIG. 2, and image data pieces are stored in a memory of the camera 26.

As shown in FIG. 13, the control unit 21 of the seller terminal 20 sends the image data pieces stored in the memory of the camera 26 together with the exhibition related information to the display control server 10 through the communication unit 23 and the network 2 based on the operation received by the operation unit 24 (S1). In S1, the seller may be able to designate which one is the reference image data piece among the image data pieces.

The control unit 11 of the display control server 10 receives image data and exhibition related information and stores them in the storage unit 12 (S2). In S2, the control unit 11 provides image data pieces with respective image data IDs, and stores them in the storage unit 12. The control unit 11 may generate thumbnail image data of all or some of the received image data pieces, and store the generated data in the storage unit 12.

The control unit 11 detects feature points $Q_K$ in respective image data pieces based on the image data pieces (S3). In S3, the control unit 11 obtains two-dimensional coordinates of feature points $Q_K$ included in respective image data pieces, and stores them in the storage unit 12 in association with feature point IDs. The method for detecting a feature point $Q_K$ was explained earlier.

The control unit 11 obtains photograph information of an image data piece based on feature points $Q_K$ of the image data piece (S4). In S4, the control unit 11 obtains photograph information for each image data piece and registers the obtained photograph information in the photograph information database. The method for obtaining photograph information was explained earlier.

The control unit 11 obtains three-dimensional coordinates of each feature point $Q_K$ (S5). In S5, the control unit 11 registers three-dimensional coordinates of each feature point $Q_K$ in the feature point database. The method for obtaining three-dimensional coordinates of a feature point $Q_K$ was explained earlier.

Preparation of exhibiting an item completes with the processing described above, and the bidder can bid the item. When the bidder uses the operation unit 34 of the bidder terminal 30 to perform a predetermined operation, the control unit 31 sends a request for displaying the item screen 40 to the display control server 10 (S6).

When the display control server 10 receives the request for displaying the item screen 40, the control unit 11 generates display data of the item screen 40, and sends the generated data to the bidder terminal 30 (S7). In S7, the control unit 11 reads an image data piece, a thumbnail image, and exhibition related information of the item, for example, from the storage unit 12, and generates the display data of the item screen 40. The display data may be data in a predetermined format, such as, HTML data.

When the bidder terminal 30 receives the display data, the control unit 31 displays the item screen 40 on the display unit 35 (S8). The control unit 31 sends the operation received at the item screen 40 (S9). Here, for simplicity, a case is explained in which a display request operation for requesting continuous display of image data pieces and a bidding operation for bidding an item are received. The display request operation is performed by designating a position in the item image 41 with a cursor 44. As such, information indicating the position designated by the cursor 44 is also sent to the display control server 10. In S9, if an operation is not received in particular, the processing is finished.

When the display control server 10 receives an operation, the control unit 11 specifies content of the operation of the bidder (S10). When it is determined that the bidder has performed a display request operation (S10; display request operation), the control unit 11 specifies the feature point $Q_K$ designated by the bidder based on the position designated by the bidder in the item image 41 (S11). In S11, the control unit 11 compares the two-dimensional coordinates designated by the bidder in the item image 41 with two-dimensional coordinates of respective feature points $Q_K$, and specifies a feature point $Q_K$ that is closest to the two-dimensional coordinates designated by the bidder among from the all feature points $Q_K$.

The control unit 11 calculates orbit information based on the feature point $Q_K$ specified in S11 (S12). In S12, the control unit 11 calculates an orbit T that moves while fixating on the feature point $Q_K$ designated by the bidder. The method for calculating the orbit was explained earlier.

The control unit 11 selects some image data pieces based on the photograph information of the image data pieces and the orbit information calculated in S12 (S13). In S13, the control unit 11 calculates evaluation values $E_N$ of respective image data pieces based on the photograph information and the orbit information of the image data pieces, and selects image data pieces in the order according to the orbit T. The method for selecting the image data pieces was explained earlier.

The control unit 11 generates continuous display data (moving image data) of the selected image data pieces, and sends the data to the bidder terminal 30 (S14). In S14, the control unit 11 generates the continuous display data such that the image data pieces are displayed in the order according to the orbit T. The continuous display data may be data in a predetermined format, such as GIF data.

When the bidder terminal 30 receives the continuous display data, the control unit 31 continuously displays the image data pieces on the display unit 35 (S15). The control unit 31 determines whether an ending condition is satisfied (S16). The ending condition is a condition for ending this processing, for example, a predetermined ending operation performed by the bidder. If it is determined that the ending condition is satisfied (S16; Y), this processing is finished. If it is determined that the ending condition is not satisfied (S16; N), the processing returns to S9.

On the other hand, in S10, it is determined that the bidder has performed a bidding operation (S10; bidding operation), the control unit 11 executes predetermined bidding processing and this processing is finished (S17). When the processing in S17 is executed, the bidder can bid the item.

According to the display control system 1 described above, the image data pieces selected based on the photograph information and the orbit information are displayed in the order according to the orbit T, which makes it unnecessary for the seller to photograph the item on various orbits with the camera 26. As such, it is possible to reduce labor of photographing an item when an item image 41 in which the item is viewed from a viewpoint moving along the orbit T is displayed. In addition, when an item exhibited in an Internet auction has fine scratches and soils, the item is displayed such that the item is viewed from various angles by continuously displaying the item images 41, and thus it is possible to check the condition of the item more accurately. In a case where a three-dimensional model of the item is generated, the item can be viewed from various directions, although it takes labor to represent scratches and soils on the item in the three-dimensional model in order to accurately display the condition of the item. According to the display control system 1, it is possible to provide the bidder with an actual condition of the item without taking such labor.

The orbit T is obtained based on the three-dimensional coordinates designated by the bidder, and thus the bidder can designate the orbit T of the viewpoint at which the bidder wants to view the item. As such, it is possible to display an image in a way that the viewpoint moves on the orbit T according to the bidder's preference. The orbit T is obtained based on the three-dimensional coordinates of the feature point $Q_K$ designated by the bidder, and thus the bidder can designate the orbit T of the viewpoint at which the feature point $Q_K$ that the bidder wants to view is photographed. As such, it is possible to display an image in a way that the position that the bidder wants to check can be viewed from various directions. Further, the bidder can check the feature point $Q_K$ more easily by obtaining orbit information of the viewpoint that moves in a way that the three-dimensional coordinates of the feature point $Q_K$ designated by the bidder is fixated. In addition, the bidder can check the feature point $Q_K$ more easily by selecting the image data piece in which the feature point $Q_K$ designated by the bidder is photographed, since in this way it is possible to display the image data piece in which the feature point $Q_K$ designated by the bidder is clearly photographed.

The image data piece is selected based on the distance $D_N$, and thus it is possible to display the image data piece having the photographing position $P_N$ closest to the orbit T. Further, the image data piece is selected based on the deviation $\theta_N$, and thus it is possible to display the image data piece having the photographing direction $V_N$ similar to the viewing direction $U_M$. In addition, in a case where a photographing position $P_N$ is deviated, a view of an object varies greatly compared to a case where a photographing direction $V_N$ is deviated. As such, the image data piece is selected based on the evaluation value weighing the deviation $\theta_N$ more than the distance $D_N$, and thus the image data piece can be selected in view of the smallness of the deviation $\theta_N$.

[5. Variation]

The present invention is not to be limited to the above described embodiment and can be changed as appropriate without departing from the spirit of the invention.

(1) For example, when there are a plurality of image data pieces at the photographing position $P_N$ that is close to the orbit T and intervals between the photographing positions $P_N$ of the image data piece selected by the image selecting unit 56 are not consistent, the image data pieces are continuously and unnaturally displayed due to inconsistent changes in angles of the camera 26 to the item. As such, the image data pieces may be continuously and naturally displayed by setting the photographing positions $P_N$ of the image data piece selected by the image selecting unit 56 at regular intervals.

Figure 14:
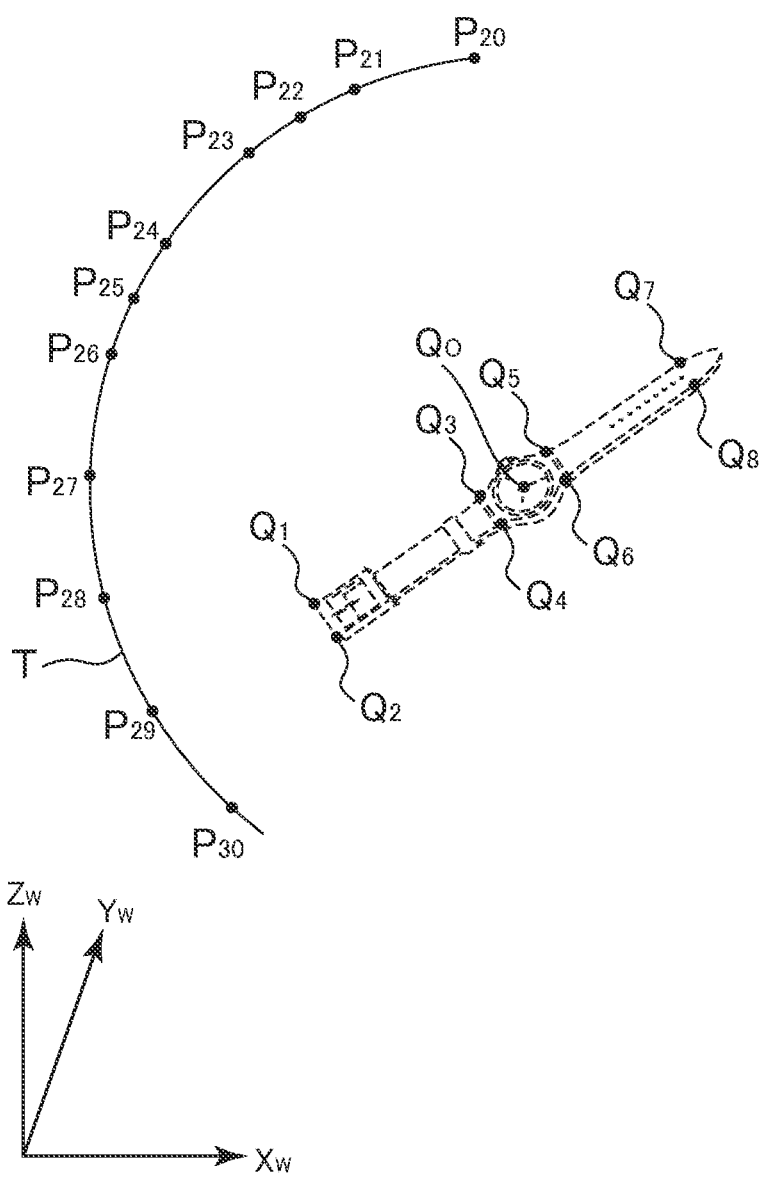
FIG. 14 is a diagram illustrating relationship between the orbit and the photographing positions.

FIG. 14 is a diagram illustrating relationship among an orbit T and photographing positions $P_N$. As shown in FIG. 14, the photographing positions $P_{20}$ to $P_{30}$ are close to the orbit T, and evaluation values $E_{20}$ to $E_{30}$ of these photographing positions are also high. However, when all of image data pieces of the photographing positions $P_{20}$ to $P_{30}$ are continuously displayed, the photographing position $P_{21}$, for example, has narrower intervals between each of adjacent photographing positions $P_{20}$ and $P_{22}$ than other intervals. Similarly, the photographing position $P_{25}$ has narrower intervals between each of adjacent photographing positions $P_{24}$ and $P_{26}$ than other intervals.

In view of this, the image selecting unit 56 of Variation (1) selects some of the image data pieces based on photographing position information of respective image data pieces, such that distances of the photographing positions $P_N$ indicated by the photographing position information of the image data pieces selected by the image selecting unit 56 are within a predetermined range. Here, a case is explained in which the predetermined distance or longer corresponds to being within the predetermined range, although less than the predetermined distance may correspond to being within the predetermined range. Assume that information indicating the predetermined range is stored in the data storing unit 53 in advance.

Regarding an image data piece having a reference evaluation value $E_N$ or more, the image selecting unit 56 calculates a distance between a photographing position $P_{N1}$ of such image data piece and a photographing position $P_{N2}$ of another image data piece that is closest to the photographing position $P_{N1}$. The image selecting unit 56 selects the image data piece as display target if the distance is within the predetermined range, and does not select the image data piece if the distance is not within the predetermined range. For example, in FIG. 14, the image selecting unit 56 does not select image data pieces at the photographing positions P22 and P25.

According to Variation (1), intervals between photographing positions $P_N$ of image data pieces to be displayed are within a predetermined range, and thus the image data pieces can be displayed naturally.

(2) For example, the display control unit 57 may determine at least either of a display position and a display size of an image data piece selected by the image selecting unit 56 so that at least either of a deviation of the display position and a deviation of the display size of the item displayed on the display unit 35 is within a reference range. The display position is a position of the item in the image, and is, for example, two-dimensional coordinates of the feature point $Q_K$. The display size is a size occupied by the item in the image, and is, for example, the number of pixels by which the item is displayed.

The display control unit 57 determines a display position of an image data piece so that a deviation of the display position of the image data piece of the item selected by the image selecting unit 56 is within a reference range. For example, the display control unit 57 refers to the two-dimensional coordinates of the feature point $Q_K$ of the image data piece, and changes the display position of the image data piece so that the deviation of the position of the two-dimensional coordinates of the feature point $Q_K$ is within the reference range.

The display control unit 57 determines a size of an image data piece so that a deviation of the display size of the image data piece of the item selected by the image selecting unit 56 is within a reference range. For example, the display control unit 57 changes the size of the image data piece so that the deviation of the ratio occupied by the item in the image data piece is within the reference range. For example, the display control unit 57 changes the size of the image data piece so that the size of the image data piece gets larger as the distance between the photographing position $P_N$ of the image data piece and the feature point $Q_K$ gets larger.

According to Variation (2), at least either of the deviation of the display position and the deviation of the display size of the image data piece of the displayed item is within the reference range, image data pieces can be naturally displayed in succession. The display control unit 57 may change both of the display position and the display size, or only one of them.

(3) For example, the embodiment explains a case in which the reference image data piece is an image data piece photographed by the seller at the photographing position that is a predetermined distance away from the item in the front direction, although the reference image data piece may be an image data piece designated by the seller among from the image data pieces to be uploaded to the display control server 10. In this case, the photographing position and the photographing direction of the image data piece designated by the seller are the photographing position $P_0$, which is the reference photographing position, and the photographing direction $V_0$, which is the reference photographing direction, respectively.

For example, the reference image data piece may be selected from image data pieces by using a predetermined method. The reference image data piece may not necessarily be designated by the seller, for example, but may be an image data piece first photographed by the seller. For example, in a case where the image data piece first photographed by the seller is the reference image data piece and the camera 26 is moved to photograph an image such that a distance between the photographing position of the image data piece and the center point of the item is consistent, deviations of distances between the camera 26 and the item among the image data pieces are small. As such, the item images 41 can be continuously displayed on the item screen 40 in an easily viewable way. In this case, when the camera 26 photographs an image, a guide to photograph the image while keeping a predetermined distance from the center of the item may be displayed on the display unit of the camera 26.

For example, when the image data pieces are selected as described in the embodiment by referring to FIG. 12, the image data pieces of the photographing positions $P_N$ that are respectively closest to the positions $T_K$ are selected. As such, even though a deviation of each position from the orbit T is small, sometimes deviations among the photographing positions $P_N$ of the image data pieces are large. In this case, as described in Variation (1), when the image data pieces are continuously displayed, they may be unnaturally displayed. As such, the image data pieces may be selected by using a method described below such that deviations among the photographing positions $P_N$ are reduced in order to achieve more natural continuous display.

The image selecting unit 56 specifies, based on a plurality of lines parallel to the orbit T, photographing positions $P_N$ for the lines, respectively. Each line may be in a predetermined distance from the orbit T, for example, a distance within a predetermined percent of the size of the area occupied by the item in the three-dimensional space in a direction perpendicular to the orbit T. Further, the image selecting unit 56 may specify a photographing position $P_N$ so that a distance to each line is within the predetermined distance, or calculate an evaluation value for each line by using a method similar to the method described in the embodiment. For example, the image selecting unit 56 may specify lines having the equal or more number of the photographing positions $P_N$ specified as described above than the number of positions $T_K$ on the orbit T (i.e., numerical value of K). Subsequently, the image selecting unit 56 selects a line based on intervals of the photographing positions $P_N$ respectively specified for the lines (i.e., intervals along the lines) and distances between the lines and the orbit T. In selecting the lines, evaluation values (different from the evaluation value $E_N$ described in the embodiment) may be calculated. Such evaluation values get higher as the deviations of intervals of the photographing positions $P_N$ get smaller. Further, such evaluation values get higher as the distances between lines and the orbit T get smaller. The numerical expression for calculating such evaluation values may be written in the program in advance. For example, the image selecting unit 56 selects the line having the highest evaluation value. On this line, photographing positions $P_N$ are aligned along the orbit T to some extent, and intervals among the photographing positions $P_N$ are consistent to some extent. Subsequently, the image selecting unit 56 selects image data pieces of respective photographing positions $P_N$ specified by the selected line.

For example, the display control unit 57 may display the image data pieces selected by the image selecting unit 56 in the order according to the orbit T. As such, other than continuous display, these image data pieces may be put in the order according to the orbit T to be displayed on the item screen 40.

For example, in the description above, the image selecting unit 56 selects the predetermined number of image data pieces each having the evaluation value $E_N$ equal to or more than the reference value, although all of the image data pieces each having the evaluation value $E_N$ equal to or more than the reference value may be selected. The above describes a case in which the image selecting unit 56 calculates evaluation values $E_N$ and selects image data pieces, although the image selecting unit 56 may select image data pieces using another method. For example, the image selecting unit 56 may select an image data piece with at least either of the distance $D_N$ and the deviation $\theta_N$ being in the predetermined range.

For example, the above describes an example in which a user designates a feature point $Q_K$ on the item screen 40, although the user may designate a viewing direction $U_M$. In this case, the image selecting unit 56 may select an image data piece in a photographing direction $V_N$ that is closest to the viewing direction $U_M$ designated by the user. The image selecting unit 56 may select an image data piece having the smallest deviation from the photographing position $P_N$ and the photographing direction $V_N$ of the selected image data piece as the image data piece to be displayed next. Subsequently, the image selecting unit 56 may select image data pieces in ascending order of deviation from the photographing position $P_N$ and photographing direction $V_N$ until the predetermined number of image data pieces are obtained.

For example, the method for obtaining the orbit information is not limited to the above described example. For example, the orbit information may be obtained without the need for the bidder to designate the feature point $Q_K$. In this case, the bidder may determine the orbit information by drawing a predetermined orbit on the item screen 40 using the operation unit 34. For example, the display unit 35 may display an image indicating photographing positions $P_N$ and photographing directions $V_N$ of an image data piece (e.g., image indicating three-dimensional space as shown in FIG. 8), and the orbit information may be obtained as the orbit drawn by bidder on the image.

For example, the above describes the case in which each function of the display control system 1 is implemented in the display control server 10, although each function may be implemented in the bidder terminal 30. In this case, the bidder terminal 30 corresponds to the display control device according to the present invention. For example, the functions may be shared among the display control server 10, the seller terminal 20, and the bidder terminal 30. For example, the feature point detecting unit 51 and the information obtaining unit 52 may be implemented in the seller terminal 20, and the seller terminal 20 may obtain feature points $Q_K$ and photograph information, and upload the obtained feature points $Q_K$ and photograph information together with the image data pieces to the display control server 10. In this case, the feature point detecting unit 51 and the information obtaining unit 52 are implemented mainly by the control unit 21. For example, the orbit obtaining unit 54 and the photograph determining unit 55 may be implemented in the bidder terminal 30, and the bidder terminal 30 may obtain the orbit information and determine whether a feature point $Q_K$ is photographed. In this case, the orbit obtaining unit 54 and the photograph determining unit 55 are implemented mainly by the control unit 31. For example, the image selecting unit 56 and the display control unit 57 may be implemented in the bidder terminal 30, and the bidder terminal 30 may select image data pieces and display the selected image data pieces on the item screen 40 in the order according to the orbit. In this case, the image selecting unit 56 and the display control unit 57 are implemented mainly by the control unit 31.

For example, the processing of the display control system 1 has been described using an example in which the item screen 40 is displayed in an Internet auction, although the display control system 1 according to the present invention may be applied to various cases other than the Internet auction. For example, the processing similar to that of the display control system 1 may be applied to a SNS service in which users communicate with one another. The display control system 1 may be applied to a case where an image data piece in which an object is photographed from a plurality of positions is displayed. As such, an object may be any physical object besides an item. In the above description, "item" can be replaced with "object", and "seller" and "bidder" can be replaced with "user."

The invention claimed is:

1. A display control system comprising at least one processor, wherein the at least one processor:
obtains a plurality of image data pieces generated by photographing an object from a plurality of photographing positions that are different from one another in photographing directions;
detects three-dimensional Cartesian coordinates of a plurality of feature points regarding the object based on at least one of the image data pieces;
wherein the feature points are different points on the object;
obtains photograph information relating to the photographing positions of the respective image data pieces in a three-dimensional space based on the image data pieces, the photograph information being obtained using positional relationships of the feature points;
calculates trajectory information relating to a trajectory of a viewpoint that moves while changing a viewing direction in the three-dimensional space based on three-dimensional Cartesian coordinates of a feature point designated from the plurality of feature points;
wherein the trajectory information includes trajectory position information of the viewpoint and viewing direction information of the viewpoint from the trajectory,
wherein the calculation includes calculating a rotation axis perpendicular to a line connecting one of the photographing positions to one of the feature points;
selects some of the image data pieces based on the photograph information of the respective image data pieces and the trajectory information; and
displays, on a display, the selected image data pieces in an order according to the trajectory.

2. The display control system according to claim 1, wherein the at least one processor calculates the trajectory information about the viewpoint that moves while fixating on the three-dimensional Cartesian coordinates of the designated feature point.

3. The display control system according to claim 1, wherein the at least one processor determines whether the designated feature point is photographed in the respective image data pieces based on the image data pieces, and
selects some of the image data pieces based on the photograph information of the respective image data pieces, the trajectory information, and a determination result.

4. The display control system according to claim 1, wherein the photograph information of the respective image data pieces comprises photographing position information of the respective image data pieces,
wherein the trajectory information comprises trajectory position information of the viewpoint, and
wherein the at least one processor selects some of the image data pieces based on distances among positions indicated by the photographing position information of the respective image data pieces and positions indicated by the trajectory position information.

5. The display control system according to claim 4, wherein the photograph information of the respective image data pieces comprises photographing direction information of the respective image data pieces,
wherein the trajectory information comprises viewing direction information about the viewpoint from the trajectory, and
wherein the at least one processor selects some of the image data pieces based on deviations of directions indicated by the photographing direction information of the respective image data pieces from directions indicated by the viewing direction information, and calculates evaluation values weighing the deviations more than the distances based on the distances and the deviations of the respective image data pieces, and selects some of the image data pieces based on the evaluation values of the respective image data pieces.

6. The display control system according to claim 1, wherein the photograph information of the respective image data pieces comprises photographing direction information of the respective image data pieces,
wherein the trajectory information comprises viewing direction information about the viewpoint from the trajectory, and
wherein the at least one processor selects some of the image data pieces based on deviations of directions indicated by the photographing direction information of the respective image data pieces from directions indicated by the viewing direction information.

7. The display control system according to claim 1, wherein the photograph information of the respective image data pieces comprises the photographing position information of the respective image data pieces, and wherein the at least one processor selects some of the image data pieces such that the distances of the positions indicated by the photographing position information of the selected respective image data pieces are within a predetermined range based on the photographing position information of the respective image data pieces.

8. The display control system according to claim 1, wherein the at least one processor determines at least either of display positions and display sizes of the selected respective image data pieces such that at least either of a deviation of the display position and a deviation of the display size of the object displayed on the display is within a predetermined range.

9. A display control device comprising at least one processor, wherein the at least one processor:
obtains content stored in a storage that stores a plurality of image data pieces and photograph information in association with one another, the plurality of image data pieces being generated by photographing an object from a plurality of photographing positions that are different from one another in photographing directions, and the photograph information being related to the photographing positions of the respective image data pieces in a three-dimensional space;
detects three-dimensional Cartesian coordinates of a plurality of feature points regarding the object based on at least one of the image data pieces, wherein the photograph information is obtained using positional relationships of the feature points;
wherein the feature points are different points on the object;
calculates trajectory information relating to a trajectory of a viewpoint that moves while changing a viewing direction in the three-dimensional space based on three-dimensional Cartesian coordinates of a feature point designated from the plurality of feature points;
wherein the trajectory information includes trajectory position information of the viewpoint and viewing direction information of the viewpoint from the trajectory,
wherein the calculation includes calculating a rotation axis perpendicular to a line connecting one of the photographing positions to one of the feature points;
selects some of the image data pieces based on the photograph information of the respective image data pieces and the trajectory information; and
display, on a display, the selected image data pieces in an order according to the trajectory.

10. A display control method comprising:
obtaining a plurality of image data pieces generated by photographing an object from a plurality of photographing positions that are different from one another in photographing directions;
detecting three-dimensional Cartesian coordinates of a plurality of feature points regarding the object based on at least one of the image data pieces;
wherein the feature points are different points on the object;
obtaining photograph information relating to the photographing positions of the respective image data pieces in a three-dimensional space based on the image data pieces, the photograph information being obtained using positional relationships of the feature points;
calculating trajectory information relating to a trajectory of a viewpoint that moves while changing a viewing direction in the three-dimensional space based on three-dimensional Cartesian coordinates of a feature point designated from the plurality of feature points;
wherein the trajectory information includes trajectory position information of the viewpoint and viewing direction information of the viewpoint from the trajectory,
wherein the calculation includes calculating a rotation axis perpendicular to a line connecting one of the photographing positions to one of the feature points;
selecting some of the image data pieces based on the photograph information of the respective image data pieces and the trajectory information; and
displaying, on a display, the selected image data pieces in an order according to the trajectory.

11. A non-transitory computer-readable information storage medium having stored thereon a program for causing a computer to:
obtain content stored in a storage that stores a plurality of image data pieces and photograph information in association with one another, the plurality of image data pieces being generated by photographing an object from a plurality of photographing positions that are different from one another in photographing directions, and the photograph information being related to the photographing positions of the respective image data pieces in a three-dimensional space;
detects three-dimensional Cartesian coordinates of a plurality of feature points regarding the object based on at least one of the image data pieces, wherein the photograph information is obtained using positional relationships of the feature points;
wherein the feature points are different points on the object;
calculate trajectory information relating to a trajectory of a viewpoint that moves while changing a viewing direction in the three-dimensional space based on three-dimensional Cartesian coordinates of a feature point designated from the plurality of feature points;
wherein the trajectory information includes trajectory position information of the viewpoint and viewing direction information of the viewpoint from the trajectory,
wherein the calculation includes calculating a rotation axis perpendicular to a line connecting one of the photographing positions to one of the feature points;
select some of the image data pieces based on the photograph information of the respective image data pieces and trajectory information relating to an trajectory of a viewpoint that moves while changing a viewing direction in the three-dimensional space; and
display, on a display, the selected image data pieces in an order according to the trajectory.

* * * * *